United States Patent [19]

Iwasaki

[11] Patent Number: 5,347,271
[45] Date of Patent: Sep. 13, 1994

[54] NETWORK SWITCHING CONTOROL METHOD AND SYSTEM

[75] Inventor: Masaaki Iwasaki, Kawasaki, Japan

[73] Assignee: Fujitsu Limited, Kawasaki, Japan

[21] Appl. No.: 891,153

[22] Filed: May 28, 1992

[30] Foreign Application Priority Data

May 28, 1991 [JP] Japan .................................. 3-152395

[51] Int. Cl.⁵ ............................................. H04L 12/24
[52] U.S. Cl. ..................................... 340/827; 370/16; 371/8.2
[58] Field of Search .......................... 340/825.01, 827; 370/16.54, 68.1; 371/8.1, 8.2; 455/8; 375/38; 379/16

[56] References Cited

U.S. PATENT DOCUMENTS

| | | | |
|---|---|---|---|
| 4,999,829 | 3/1991 | Fite, Jr. et al. | 370/16 |
| 5,130,974 | 7/1992 | Kawamura et al. | 370/16 |
| 5,235,599 | 8/1993 | Nishimura et al. | 370/16 |
| 5,241,534 | 8/1993 | Omuro et al. | 455/8 |

*Primary Examiner*—Benedict V. Safourek
*Attorney, Agent, or Firm*—Staas & Halsey

[57] ABSTRACT

A network switching control met:hod controls switching from an active route to a protection route when a failure has occurred in any of nodes of a communications network or any of transmission paths connecting the nodes so that the communications network is formed. Route switching is performed quickly and efficiently. The protection route is formed via n nodes among the plurality of nodes where n is an integer larger than or equal to 2. The method includes the step of generating, at a first node which is one of the n nodes, a switching control instruction which includes information for requesting each of $n-1$ nodes other than the first node to form the protection route. The switching control instruction includes address information concerning the nodes forming the protection route. The method includes the step of sending the switching control instruction, without including other management information at that time, from the first node to a second node which is one of the $n-1$ nodes adjacent to the first node. The method includes the step of generating, at each ith node where $i=2, 3, \ldots, n-1$, where n is greater than or equal to 4, a switching control instruction to be transferred to a first adjacent node in the protection route. The switching control instruction is transferred in response to receipt of information indicating an address of the ith node included in a switching control instruction transferred from a second adjacent node in the protection route. The method includes the step of transferring the switching control instruction generated by the above step to the first adjacent node from the ith node.

19 Claims, 20 Drawing Sheets

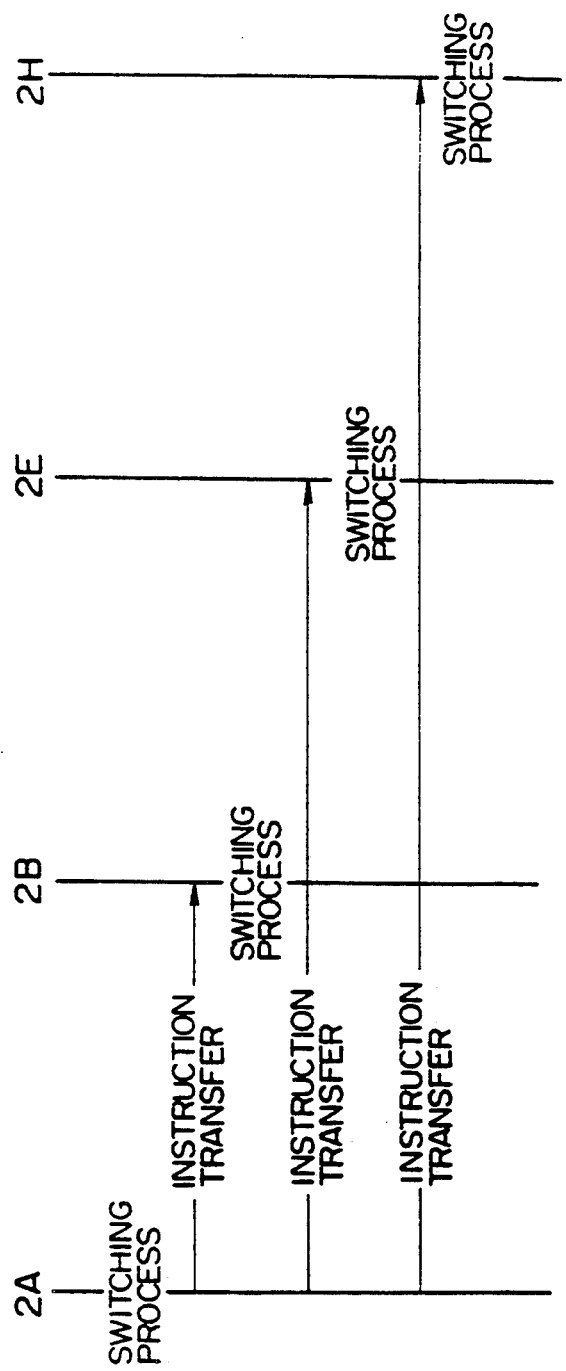

FIG.5A
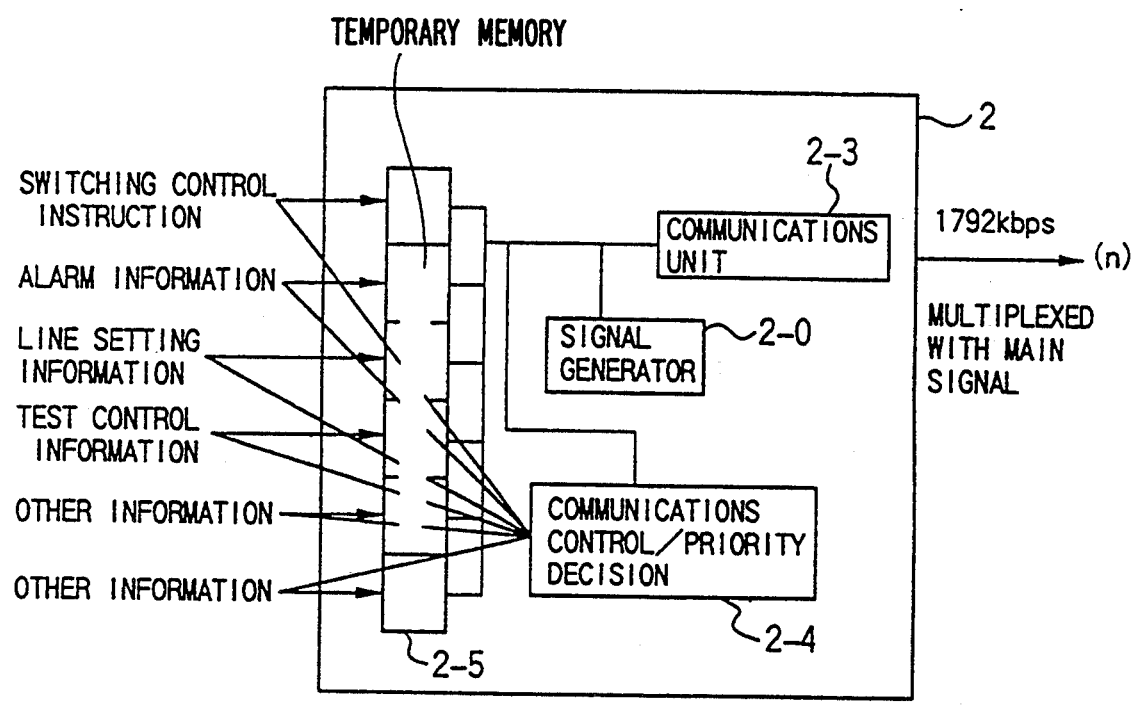
FIG.5B
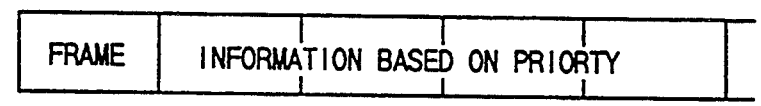

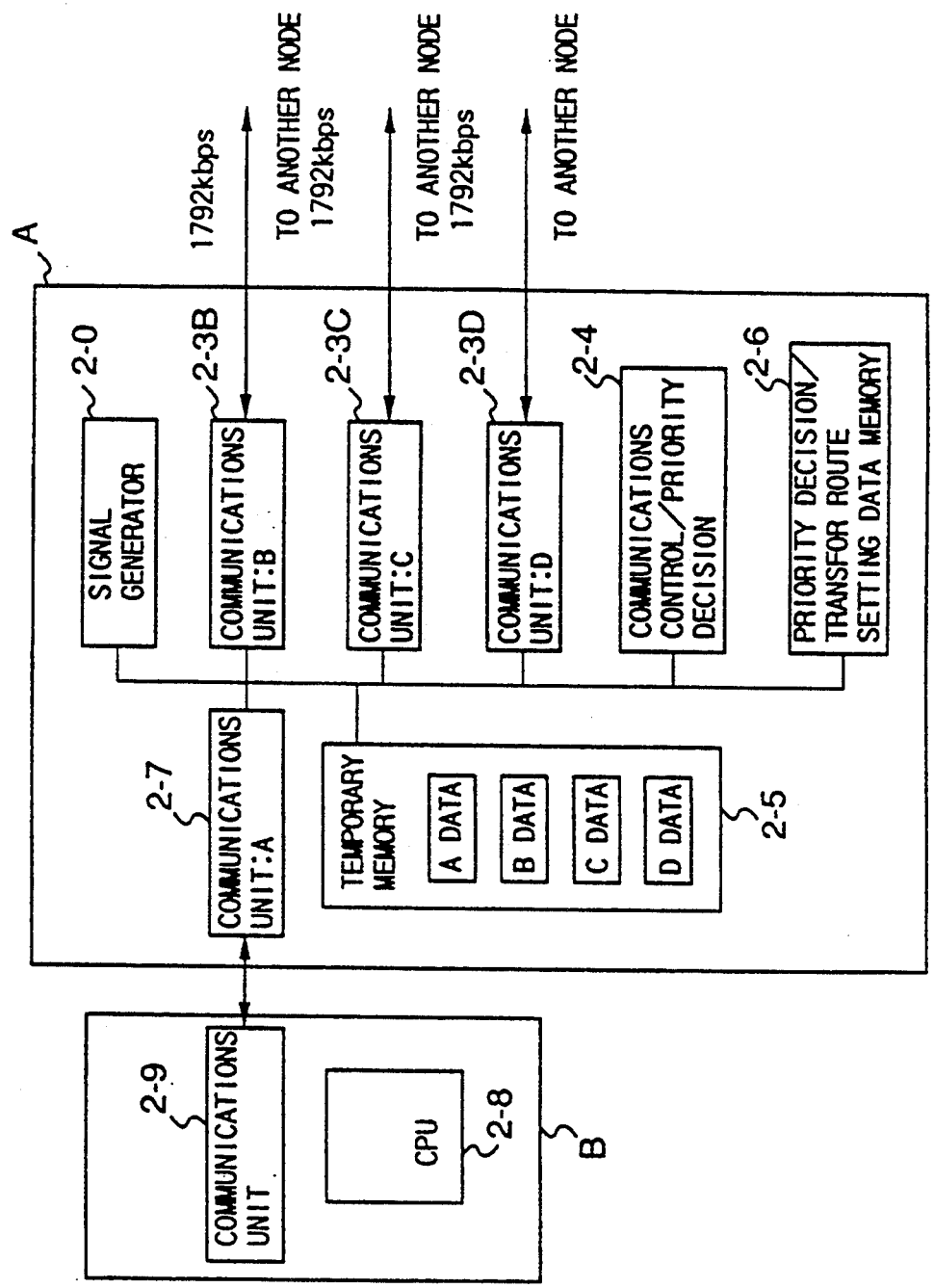

FROM FIG.13A    FIG. 13B

```
IDENTIFY NODES RESPECTIVELY SPACED APART FROM NODE A BY
DISTANCE "1" IN A STATE WHERE TRANSMISSION PATH IS
CONNECTED TO END NODE IN EACH DIRECTION, AND CALCULATE
THE NUMBER OF THE NODES.

INITIALIZE THE NUMBER OF NODES, EACH SPACED APART FROM
NODE A BY DISTANCE "1"            AD (AL+1) =0

CHECK END NODE IN EACH DIRECTION FROM NODE A

REPEAT i=1-AD (AL) TIMES
    CHECK, FOR EACH TRANSMISSION PATH, THE NUMBER OF
    TRANSMISSION PATHS CONNECTED TO END NODE AN (AL,i-1)
    (=LINE_N)
        WHEN LINE N = 0, END IN ABNORMALITY ─────────── ③
    REPEAT i = 1-LINE_N TIMES
        REGARDING EACH NODE CONNECTED TO END NODE
        AN ( AL,i -1) (= NODE ( j ) ), CHECK WHETHER EACH NODE IN
        EACH DISTANCE FROM NODE A HAS BEEN PASSED
        REPEAT m = 0-AL TIMES
            REPEAT n = 0 - AD ( m ) - 1 TIMES
                NODE ( j ) MATCH AN ( m,n ) ?
                    YES: TO NEXT j
                TO NEXT n
        TO NEXT m
        NODE WHICH HAS BEEN PASSED IS IDENTIFIED AND
        REGISTERED
        AN ( AL+1 ) ,AD ( AL+1 ) = ' (ITS NODE NAME ) '
        AP ( AL+1 ) ,AD ( AL+1 ) -1 ) = 'AN ( AL,i-1 ) + ( ITS NODE NAME ) '
        CHECK WHETHER NODE ( j ) HAS BEEN REGISTERED IN ROUTES
        FROM NODE Z
        REPEAT n = 0 - ZD ( ZL ) -1 TIMES
            NODE ( j ) MATCH ZN ( ZL,n ) ?
                YES : ROUTE FROM NODE A REACHES ROUTE FROM NODE
                Z, AND HENCE THIS ROUTE IS ROUTE WHICH
                    AD ( AL+1 ) -1 ) AND ZP ( ZL,n ) TRY TO OBTAIN ─── ②
            TO NEXT n
    TO NEXT j
TO NEXT i
WHEN AD ( AL+1 ) ) = 0, END IN ABNORMALITY
WHEN AD ( AL+1 ) >0, AL = AL+1
```

TO FIG.13C

② SUCCESSFUL END
③ ABNORMAL END

FIG. 13C

FROM FIG.13B

```
IDENTIFY NODES RESPECTIVELY SPACED APART FROM NODE A BY
DISTANCE "1" IN A STATE WHERE TRANSMISSION PATH IS
CONNECTED TO END NODE IN EACH DIRECTION, AND CALCULATE THE
NUMBER OF THE NODES.

INITIALIZE THE NUMBER OF NODES, EACH SPACED APART FROM NODE
z BY DISTANCE "1"          zD (zL+1) =0

CHECK END NODE IN EACH DIRECTION FROM NODE A

REPEAT i=1-zD (zL) TIMES

CHECK,FOR EACH TRANSMISSION PATH,THE NUMBER OF
    TRANSMISSION PATHS CONNECTED TO END NODE zN (zL,i-1)
    (=LINE_N)
        WHEN LINE N = 0, END IN ABNORMALITY ─────────────③
    REPEAT i = 1-LINE_N TIMES
        REGARDING EACH NODE CONNECTED TO END NODEAN ( AL,i -1)
        (= NODE ( j ) ), CHECK WHETHER EACH NODE IN EACH DISTANCE
        NODE Z HAS BEEN PASSED
        REPEAT m = 0 - AL TIMES
              REPEAT n = 0 - ZD ( m ) - 1 TIMES
                 NODE ( j ) MATCH AN ( m,n ) ?
                     YES: TO NEXT j
              TO NEXT n
        TO NEXT m
        NODE WHICH HAS BEEN PASSED IS IDENTIFIED AND
        REGISTERED
         ZN ( ZL+1 ) ,ZD ( ZL+1 ) = ' (ITS NODE NAME ) '
         ZP ( ZL+1 ) ,ZD ( ZL+1 ) -1 ) = 'AN ( ZL,i-1 ) + ( ITS NODE NAME ) '
        CHECK WHETHER NODE ( j ) HAS BEEN REGISTERED IN ROUTES
        FROM NODE Z
        REPEAT n = 0 - AD ( AL ) -1 TIMES
             NODE ( j ) MATCH AN ( AL,n ) ?
                 YES : ROUTE FROM NODE Z REACHES ROUTE FROM NODE
                 A, AND HENCE THIS ROUTE IS ROUTE WHICH
                    ZD ( ZL+1 ) -1 ) AND AP ( AL,n ) TRY TO OBTAIN.──②
        TO NEXT n
    TO NEXT j
TO NEXT i
WHEN ZD ( ZL+1 ) ) = 0, END IN ABNORMALITY
WHEN ZD (ZL+1 ) >0, ZL = ZL+1
```

TO ① IN FIG.13A

② SUCCESSFUL END

③ ABNORMAL END

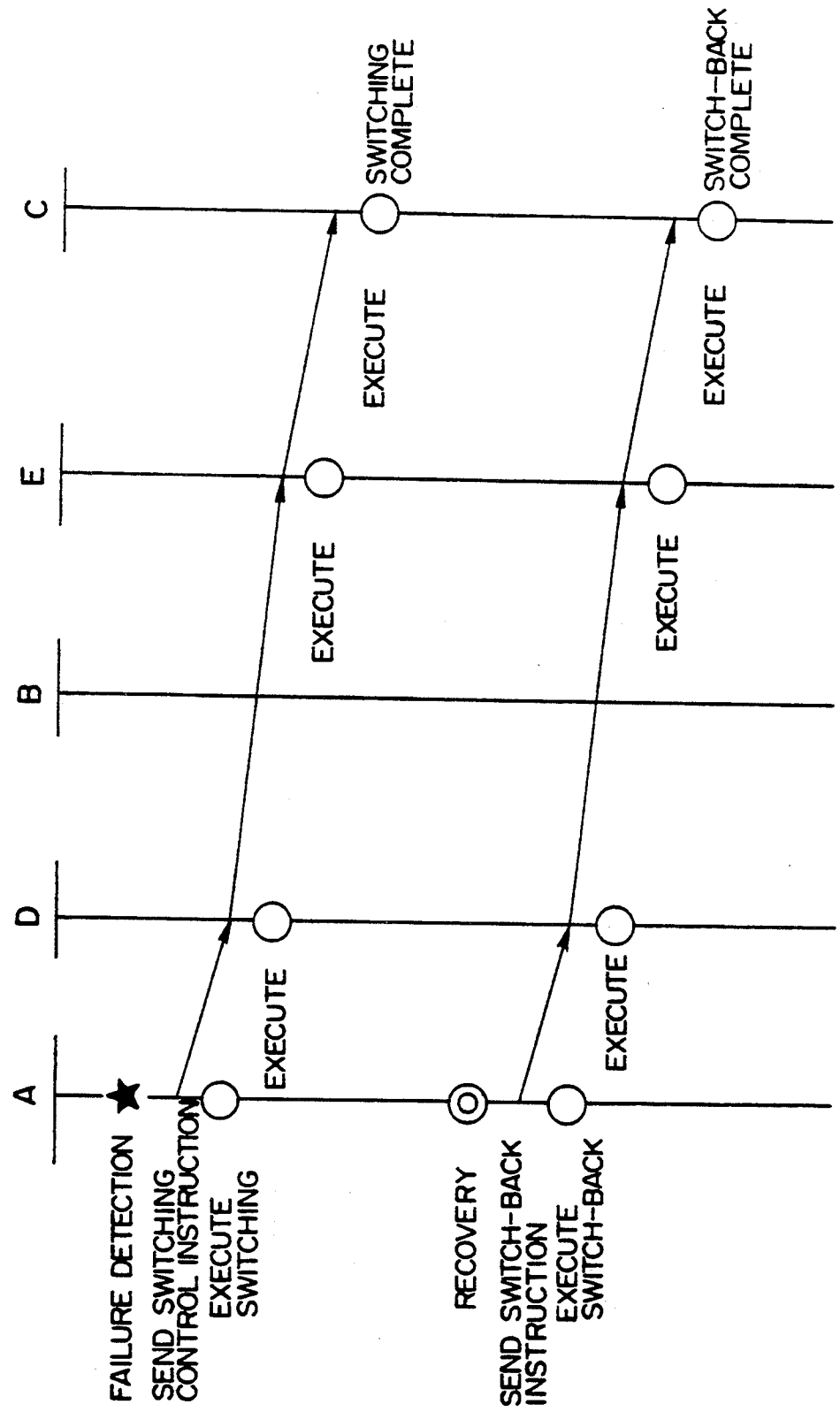

NETWORK SWITCHING CONTOROL METHOD AND SYSTEM

BACKGROUND OF THE INVENTION

1. Field of the Invention

The present invention generally relates to a communications system in which a plurality of nodes are connected via transmission lines. More particularly, the present invention is concerned with a network switching control method and system used in such a communications system.

2. Description of the Prior Art

Recently, there has been an increased demand for communications networks. It is required that communications services be continuously provided or interrupted during a short period when a failure has occurred in communications facilities or lines. Hence, it is necessary to switch to one or a plurality of protection route channels (channel or channels in a route) if a failure has occurred in a node or a communications line.

FIG. 1A shows a conventional high-bit-rate optical communications system. The system shown in FIG. 1A comprises optical terminal station repeaters 100-0, 100-1, ..., 100-n (where n is an integer), optical terminal station repeaters 110-0, 110-1, ..., 110-n, optical intermediate optical terminal station repeaters 102-0, 102-1, ..., 102-n, transmission paths 103 using optical fiber cables, and switching controllers 101 and 111. The repeaters 100-0–100-n and repeaters 110-1–110-n are coupled to each other via the repeaters 102-0–120-n and transmission paths 103.

Active lines are formed by the repeaters 100-1–100-n, 102-1–102-n, and 110-1–110-n, and protection lines are formed by the repeaters 100-0, 102-0 and 110-0. The switching controller 101 selectively couples communications channels on the input side of the system shown in FIG. 1A with the repeaters 100-1–100-n or 100-0. Similarly, the switching controller 111 selectively couples communications channels on the output side of the system shown in FIG. 1A with the repeaters 110-1–110-n or 110-0.

Normally, communications take place via the active lines. If a failure has occurred in a route via the repeater 102-n, the switching controllers 101 and 111 respectively select the repeaters 100-0, 102-0 and 110-0, as shown in FIG. 1B. Hence, a route via the repeaters 100-0, 102-0 and 110-0 is activated. It is necessary to switch to the repeaters 100-0, 102-0 and 110-0 for a short period in order to continuously perform communications services without any interruption.

In the conventional systems, active lines and protection lines are provided in a route, which is a communications path provided by a cable including 10 bound optical fibers covered by an insulating coat. If such a route (cable) happens to be mistakenly cut during a maintenance operation, not only the active lines but also the protection lines are disconnected. In this case, the protection lines are no longer capable of functioning as protection lines. In the conventional technique, another available route is manually searched for, and hence the communications services are greatly degraded.

With the above in mind, in the conventional technique, nodes 2A–2I are coupled to each other via optical fibers 121 so that a network is constructed as shown in FIG. 2A, and a network management device 120 is coupled to the nodes 2A–2I via control lines 122, so that the switching operations of the nodes 2A–2I are controlled by instruction signals transferred from the network management device 120 via the control lines 122. For example, if the route between the nodes 2D and 2G is totally cut in a state where a communications channel 4C passing through the nodes 2A, 2D, 2G and 2H has been established, the node 2A is informed of the occurrence such a failure. In response to the instruction signal from the network management device 120, the switching is carried out so that a communications channel 5C passing through the nodes 2A, 2B, 2E and 2H is established.

The above switching is carried out as shown in FIG. 2B. The node 2A sends the node 2B a switching control instruction to establish the communications channel 5C. In response to receipt of the switching control instruction, the node 2B executes a necessary switching operation. After receiving a switching completion signal from the node 2B, the node 2A sends the node 2E a switching control instruction similar to that sent to the node 2B. The node 2B executes a necessary switching operation. After receiving a switching completion signal from the node 2E, the node 2A sends the node 2H a switching control instruction similar to the switching control instructions sent to the nodes 2B and 2E. In this manner, the node 2A generates the switching control instruction for each of the nodes and transfers it to each of the nodes. Hence, it takes a long time to complete the switching for establishing the communications channel 5C.

The switching control instructions respectively sent to the nodes are transferred by using a fixed signal frame format as shown in FIG. 3B. The fixed signal frame format is generated by a data multiplexer unit 130 shown in FIG. 3A. The fixed signal frame format shown in FIG. 3B includes information to be multiplexed with a main signal, the above information containing the switching control instruction, alarm information, line setting information, test control information and other information. A capacity of 512 kbps is assigned to the switching control instruction, and a capacity of 128 kbps is allotted to each of the alarm information and the test control information, A capacity of 256 kbps is allotted to the line setting information. Two blocks each having a capacity of 256 kbps are assigned to other information, The control information is contained in a 1792 kbps signal frame, which is multiplexed with the main signal.

The signal frame format shown in FIG. 3B is a fixed format, and the fixed line capacities are allotted to the line setting information and the test control information which are not always used. The switching control instruction is transferred together with all of the other information. Hence it is impossible to efficiently perform the route switching in response to the occurrence of a failure.

SUMMARY OF THE INVENTION

It is a general object of the present invention to provide a network switching method and system in which the above disadvantages are eliminated.

A more specific object of the present invention is to efficiently perform the route switching during a shorter period.

The above objects of the present invention are achieved by a network switching control method for controlling switching from an active route to a protection route when a failure has occurred in any of nodes of a communications network or any of transmission paths connecting the nodes so that the communications network is formed. The protection route is formed via n nodes among the plurality of nodes, where n is an integer larger than or equal to 1. The network switching control method comprises the steps of:

(a) generating, at a first node which is one of the n nodes, a switching control instruction which includes information for requesting each of n-1 nodes other than the first node to form the protection route, the switching control instruction including address information concerning the nodes forming the protection route;

(b) sending the switching control instruction from the first node to a second node which is one of the n-1 nodes adjacent to the first node;

(c) generating, at each ith node where i=2, 3, ..., n-1, a switching control instruction to be transferred to a first adjacent node in the protection route in response to receipt of information indicating an address of the ith node included in a switching control instruction transferred from a second adjacent node in the protection route; and (d) transferring the switching control instruction generated by the step (c) to the first adjacent node from the ith node.

The above objects of the present invention are also achieved by a network switching control system comprising:

a plurality of nodes;

a plurality of transmission routes including an active route and a protection route; and network management means, operatively coupled to the nodes, for managing a network formed by the nodes connected to the transmission routes;

The plurality of nodes each comprise:

switch means for selectively coupling incoming communications channels and outgoing communications channels with one another;

first means for generating a switching control instruction which requests the nodes to form the protection route instead of the active route in response to the switching control instruction transferred from a first adjacent node in the protection route; and second means, operatively coupled to the switch means and the first means, for transferring the switching control instruction generated by the first means to a second adjacent node in the protection route via the switch means.

BRIEF DESCRIPTION OF THE DRAWINGS

Other objects, features and advantages of the present invention will become more apparent from the following detailed description when read in conjunction with the accompanying drawings, in which:

FIGS. 2A and 2B are diagrams of another conventional optical communications system;

FIG. 5A is a block diagram of a data multiplexer unit provided in each node;

FIG. 5B is a diagram showing a signal frame format;

FIG. 6 is a block diagram of a network switching control instruction transfer circuit:

FIGS. 13A, 13B and 13C are flowcharts showing the sequence for determining the active and protection lines;

FIGS. 16A, 16B and 16C are diagrams showing a second embodiment of the present invention.

DESCRIPTION OF THE PREFERRED EMBODIMENTS

Figure 1A:
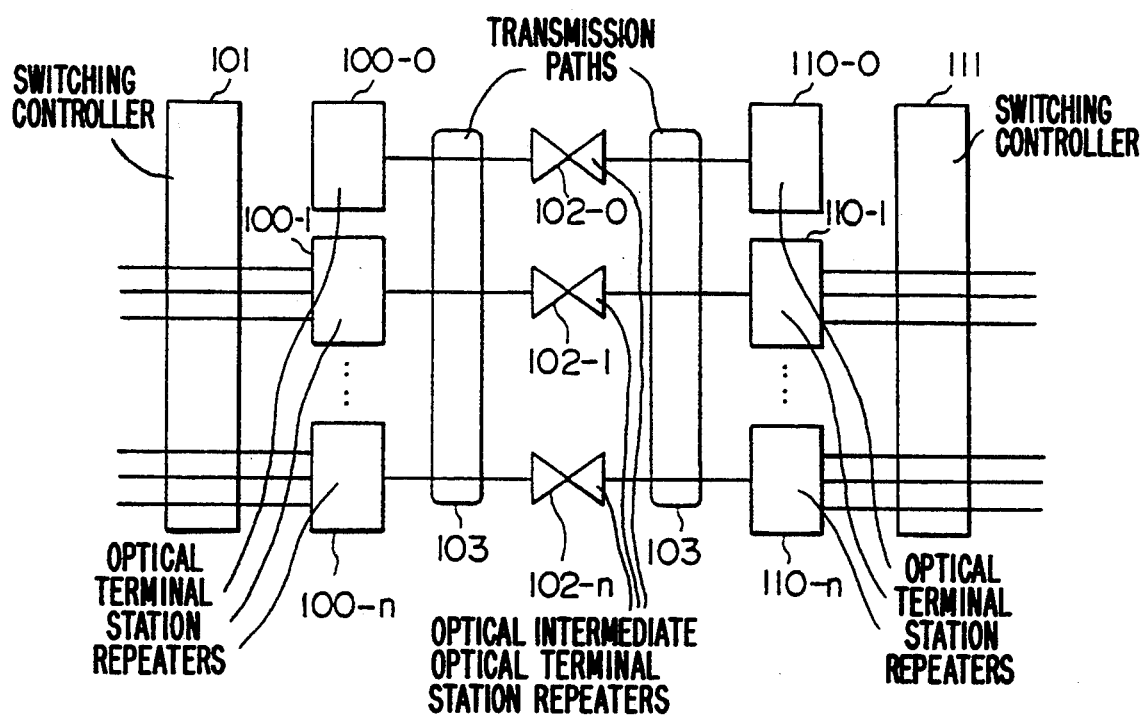
FIGS. 1A and 1B are respectively block diagrams of a conventional high-bit-rate optical communications system.
Figure 1B:
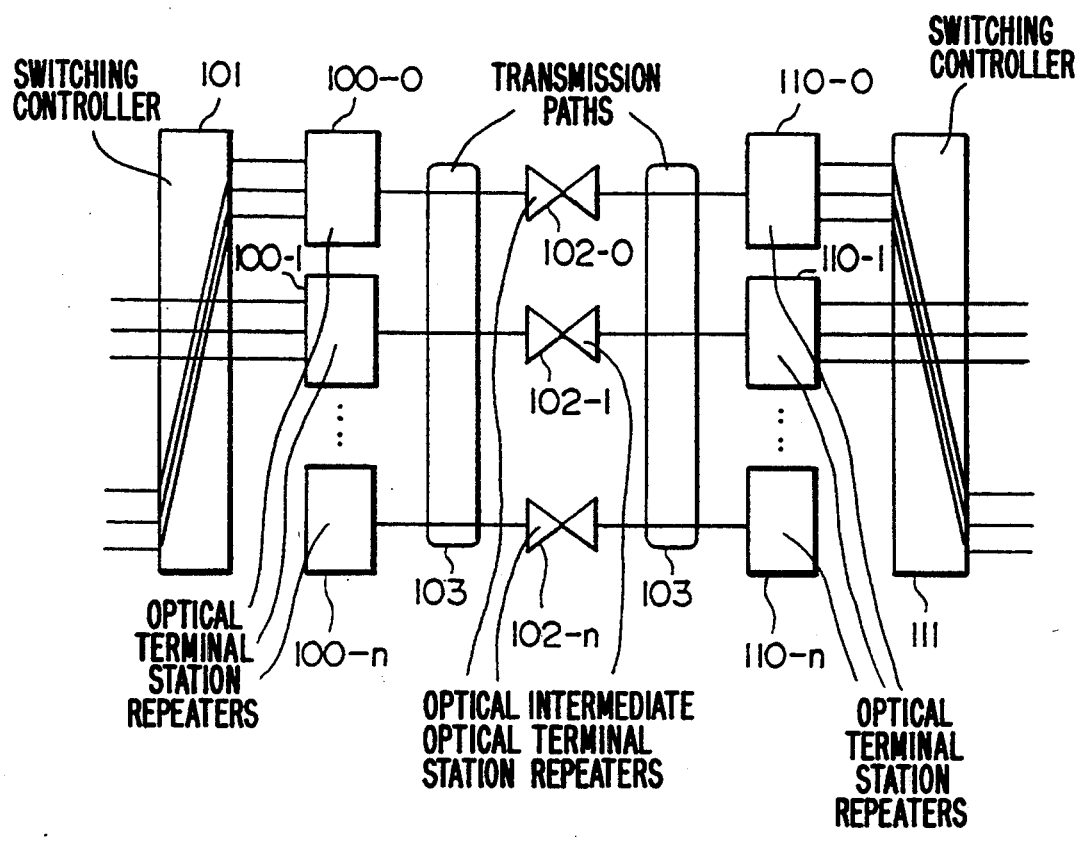
Figure 2A:
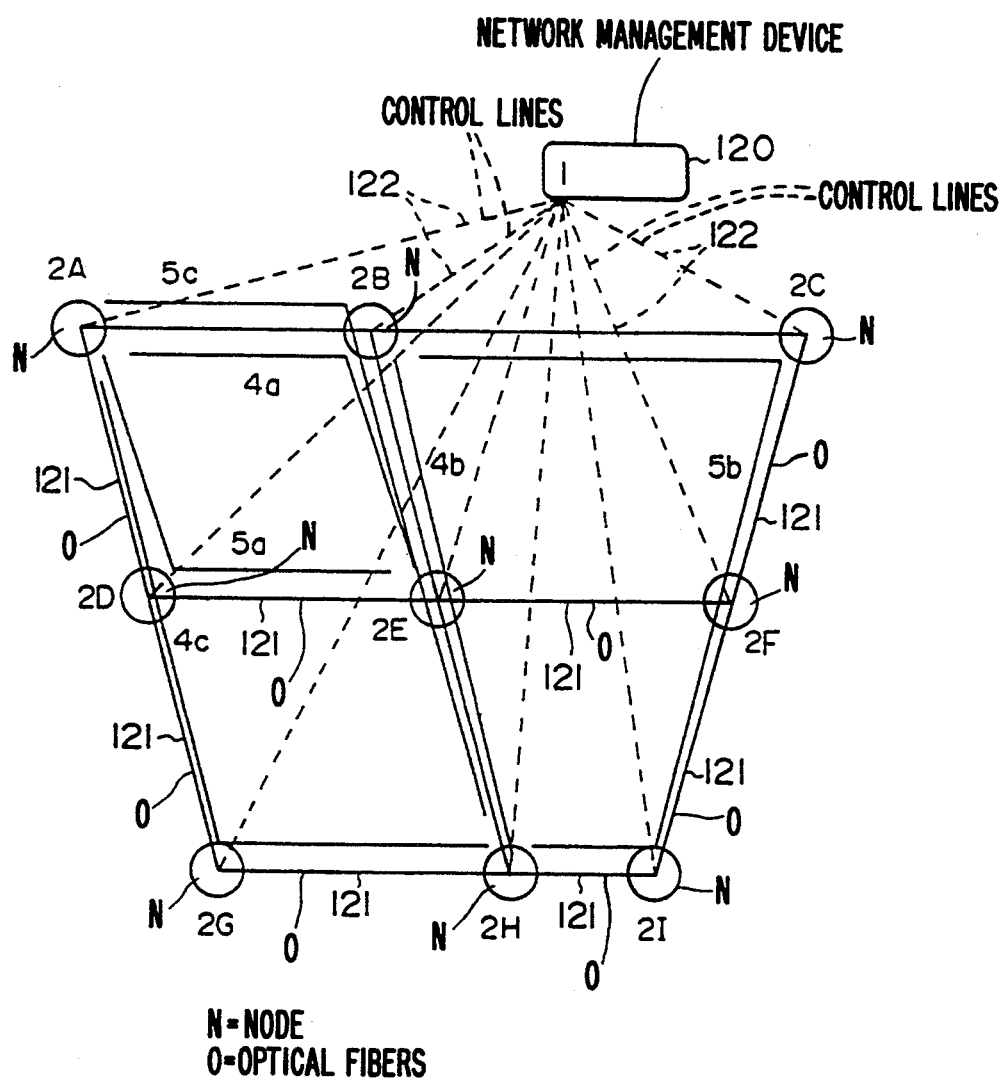
Figure 4A:
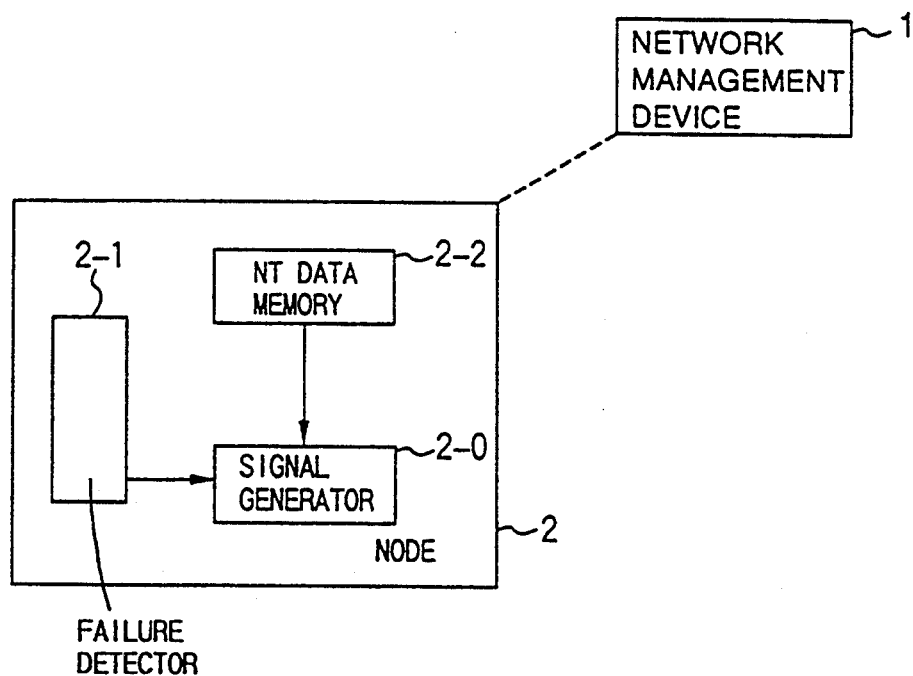
FIGS. 4A, 4B and 4C are diagrams showing the principle of the present invention.

FIG. 4A is a block diagram of an overview of the present invention. FIG. 4A shows a node, which is one of a plurality of nodes connected so that a network is formed as shown in FIG. 2A, and a network management device 1. As shown in FIG. 4A, the node comprises a signal generator 2-0, a failure detector 2-1, and a network (NT) data memory 2-2. The network management device sends the node 2 data concerning a protection route based on the location where the failure has occurred, and a communications destination of the node 2. The node 2 temporarily stores the data from the network management device 1 in the NT data memory 2-2. When the failure detector 2-1 detects a failure which has occurred in the network, it informs the signal generator 2-0 of the detected failure. The signal generator 2-0 generates a switching control instruction having a signal format shown in FIG. 4B.

It will now be assumed that the node 2 shown in FIG. 4A is one of the network shown in FIG. 2A. If a communications channel passing through the nodes 2A, 2B, 2E and 2H is established, the signal generator 2-0 of the node 2A generates a switching control instruction A having the format shown in FIG. 4B. The format shown in FIG. 4B includes a flag field (FLAG) A-1, an address field (ADDR) A-2, a control field (CONT) A-3, a network address field (NETWORK ADDR) A-4, a switching control instruction field A-5, a frame check sequence field (FCS) A-6, and a flag field (FLAG) A-7.

The node 2A writes the address of only the node 2B into the address field A-2, and writes control information necessary for communications between the codes 2A and 2B into the control field A-3. Further, the node 2A writes the addresses of the nodes 2B, 2E and 2H into the network address field A-4, and writes switching control instruction information, and data concerning a routing direction and a channel number into the switching control instruction field A-5. Furthermore, the node 2A writes beginning and end flags into the flag fields A-1 and A-7, respectively, and writes error check data into the error check field A-6. The node 2A executes the switching from the node 2D to the node 2B, and sends the node 2B the switching control instruction A.

Figure 4B:
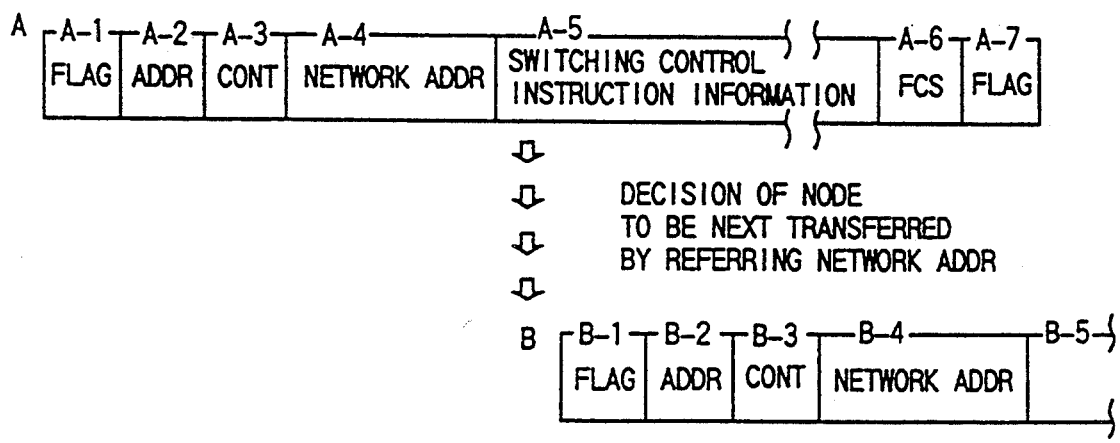
Figure 4C:
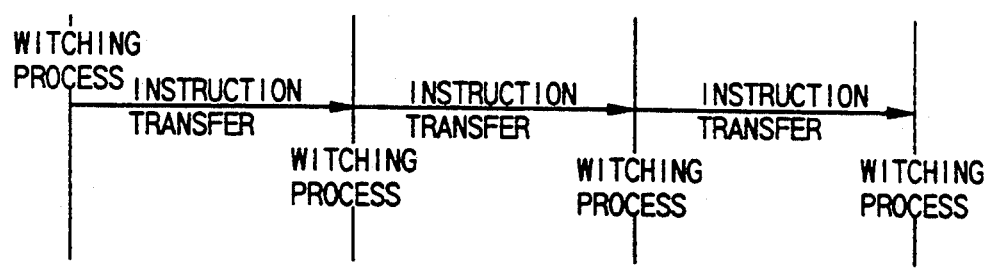

In response to receipt of the switching control instruction A, the node 2B sequentially decodes the data written into the fields A-1, A-2, A-3 and A-4. When the node 2B decodes the field A-4, it recognizes that the switching control instruction should be transferred to the node 2E. Then, as shown in FIG. 4B, the node 2B writes the beginning flag into a flag field B-1, writes the address of the node 2E in an address field B-2, and writes control information necessary for communications between the nodes 2B and 2E into a control field B-3. Further, the node 2B writes the addresses of the nodes 2E and 2H into a network address field B-4. The contents of the switching control instruction field A-5 is already read when the above-mentioned information has been written into the fields B-1–B-4. The node 2B writes, on the basis of the readout contents of the field A-5, the switching control instruction information with respect to the nodes 2E and 2H into a switching control instruction field B-5. Finally, data about the frame check sequence is written into a frame check sequence field, and the end flag is written into the corresponding field. In this manner, the node 2B starts to generate a switching control instruction B in the abovementioned manner when the decoding of the contents of the network address field A-4 has been completed. Of course, the switching operation based on the switching control instruction A transferred from the node 2A is performed in the node 2B. The node 2E executes a process for transferring the switching control instruction and a switching process. The node 2H executes a switching process.

As has been described above, the node 2A sends the switching control instruction only one time. A node which has received the switching control instruction A from the node 2A starts to generate the switching control instruction when the node to which the switching control instruction should be transferred has been identified. As a result, it is not necessary to include the alarm information, the line setting information, the test control information and so on in the frame in order to send the switching control instruction to each node. Hence, only the switching control instruction can be sequentially sent to each node rapidly, and the protection communications channel can be immediately established.

A description will now be given, with reference to FIGS. 5A through FIG. 10, of an embodiment of the present invention.

Referring to FIG. 2, a data multiplexer unit 2 provided in each node comprises a communications unit 2-3, a communications control/priority decision unit 2-4, and a temporary memory 2-5. The communications unit 2-3 is used for communicating with an adjacent node. More specifically, the communications unit 2-3 reads data from the temporary memory 2-5, and sends the readout data to the adjacent node in serial form. Serial data transferred via a transmission path has a bit rate of, for example, 1792 kbps, and contains a main signal and the aforementioned categories of information. For example, the communications unit 2-3 outputs the network switching control instruction shown in FIG. 4B and generated by the signal generator 2-0 to the transmission path in serial form. The signal generator 2-0 generates, in addition to the switching control instruction information, the alarm information, the line setting information, the test control information and other information. In general, the communications unit 2-3 outputs the above information to the transmission path in a signal format shown in FIG. 5B. The length of the signal frame format shown in FIG. 5B is, for example, equal to that of the signal frame format shown in FIG. 3B.

The communications control/priority decision unit 2-4 discriminates the switching control instruction information, the alarm information, the line setting information and other information transferred from respective information sources from each other, and determines priority among them. Then the unit 2-4 instructs the signal generator 2-0 to generate corresponding signals each having the format. The switching control information has the highest priority, and the alarm information, the line setting information and the test control information have priority in that order.

The temporary memory 2-5 temporarily stores the switching control instruction information, the alarm information and other information. For example, if a failure has occurred in the route between the nodes 2D and 2G in the network shown in FIG. 2A, information showing that a communications channel should be established via a route passing through he nodes 2B, 2E and 2H is written into the temporary memory 2-5 of the node 2A. The communications control/priority decision unit 2-4 sends the above information to the signal generator 2-0, and generates the switching control instruction for the network switching shown in FIG. 4B. In the above-mentioned manner, each piece of information is sequentially transferred according to the priority defined among them.

Figure 3A:
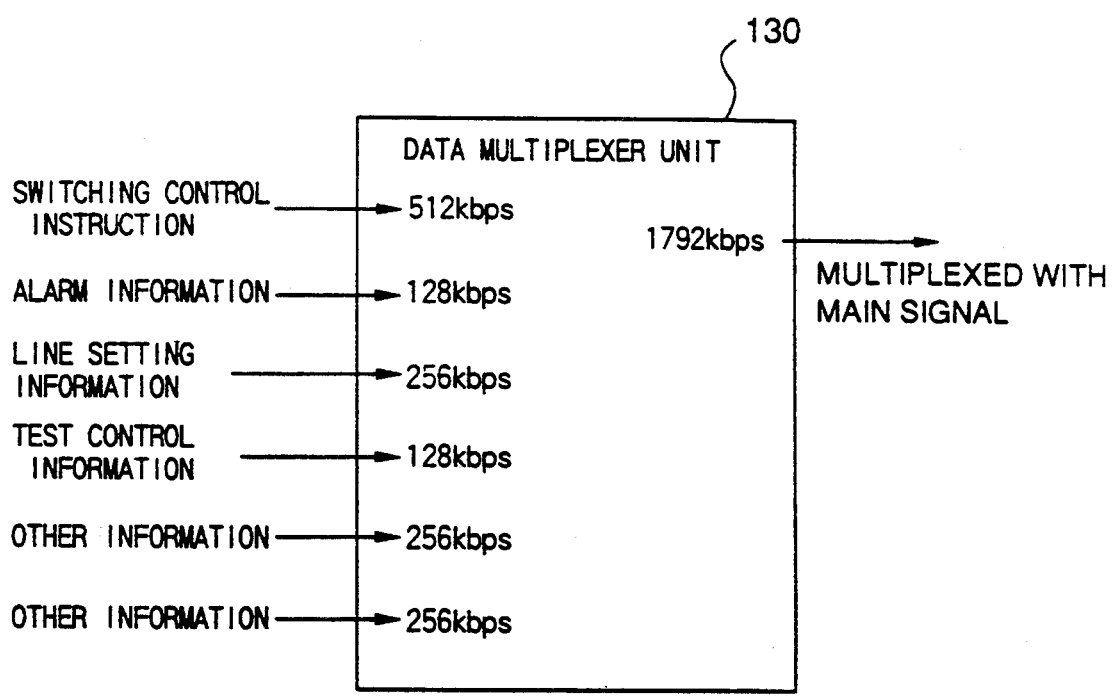
FIGS. 3A and 3B are diagrams showing a switching control process executed in the communications system shown in FIGS. 2A and 2B.
Figure 3B:
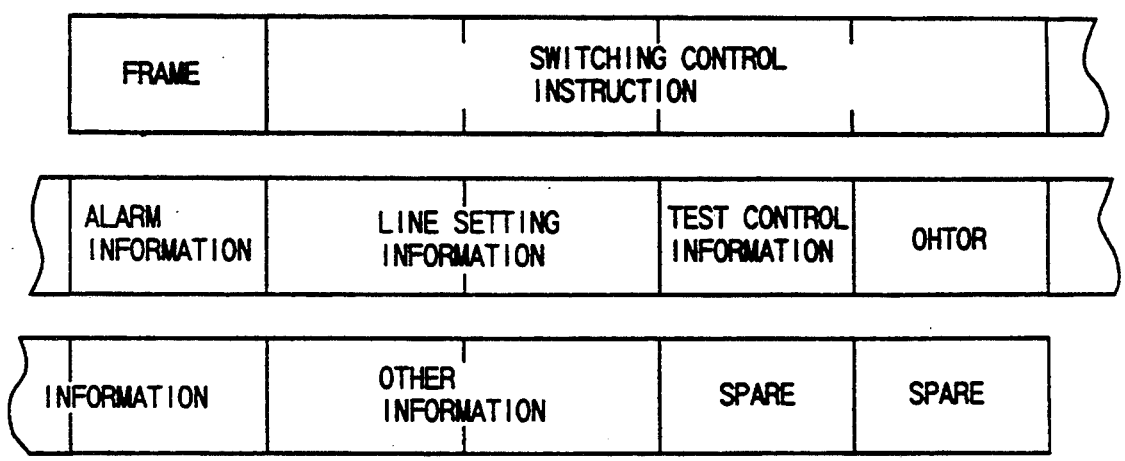

It will be noted that in the prior art, the switching control information is transferred in the fixed format shown in FIG. 3B in which the alarm information field, the line setting information field and the other information fields are defined, while only the switching control instruction can be multiplexed with the main signal and transferred according to the present invention. Hence, the signals can be efficiently transferred.

FIG. 6 shows a network switching control instruction transfer unit A, and a failure information detection/line setting control unit B, both of which are provided in each node. In FIG. 6, those parts which are the same as those shown in FIG. 5A are given the same reference numerals. The unit A comprises a priority decision/transfer route setting data memory 2-6, and a communications unit 2-7 for communicating with the unit B. The unit B comprises a CPU (Central Processing Unit) 2-8, and a communications unit 2-8 for communicating with the unit A. Communication units 2-3B-2-3D, which correspond to the communications unit 2-3 shown in FIG. 6, are used for communicating with adjacent nodes.

The failure information detection/line connection control unit B detects a failure which has occurred in the network, and informs the network switching control instruction transfer unit A of the occurrence of the failure if it must be eliminated. Further, the unit B executes the line connection control process when a failure has been detected.

In response to receipt of the occurrence of the failure which should be eliminated, the unit A generates and outputs the switching control instruction shown in FIG. 4B, and transfers the switching control instruction received from a node to another node. In order to execute the above process, the unit A temporarily stores, in the built-in temporary memory 2-5, information transferred from the unit B and the switching control information transferred from another node. It is possible to send information stored in the temporary memory 2-5 to the communications units 2-3B, 2-3C, 2-3D and 2-7 at the same time.

The priority decision/transfer route setting data memory 2-6 stores data showing the priority order regarding the switching control instruction, the alarm information, the line setting information, the test control information and so on, and stores transfer route setting data necessary for generating the switching control instruction. The signal generator 2-0 uses the information stored in the memory 2-6, and generates the switching control instruction shown in FIG. 4B in response to an instruction from the network management device 1 or the switching control instruction transferred from another node.

A description will now be given, with reference to FIGS. 7A and 7B, of a sequence in which the switching control instruction is sequentially transferred. In the sequence shown in FIGS. 7A and 7B, the switching control instruction is sequentially sent from node #1 to nodes #2 and #3.

Figure 7A:
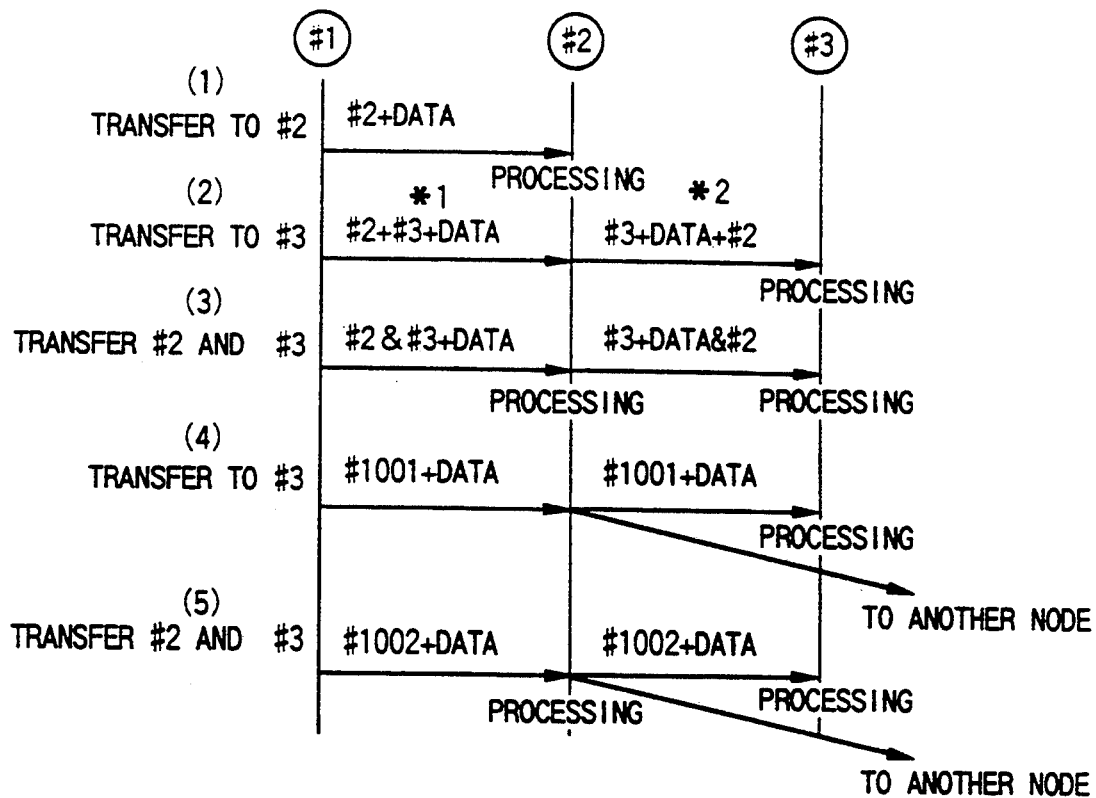
FIGS. 7A and 7B are diagrams showing a process for specifying a node address contained in a network switching control instruction.
Figure 7B:
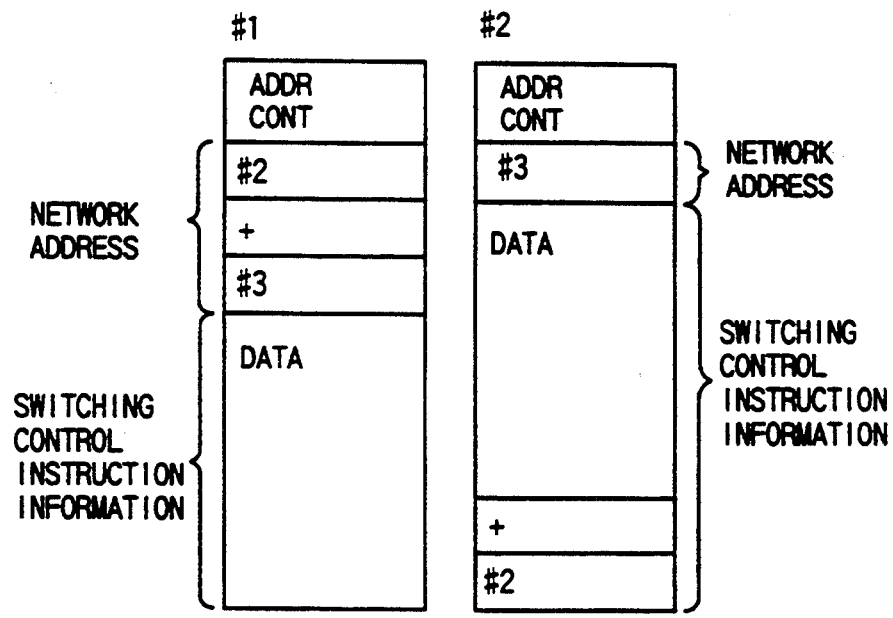

In case (1) shown in FIG. 7A, node #1 transfers the switching control instruction to node #2. Node #2 receives the switching control instruction and executes the switching control process. It will be noted that symbol "+" in FIG. 7B denotes the joint of the node address and data.

In case (2) shown in FIG. 7A, the switching control instruction generated by node #1 is transferred to node #3 via node #2. In this case, as shown in the left side of FIG. 7B, the node addresses #2+#3, which shows that the switching control instruction is transferred in this sequence, are written into the network address of the switching control instruction. The switching control instruction information, which contains data concerning a command and switching information for the requested switching control, is written into the switching control instruction field of the switching control instruction. As shown in the right side of FIG. 7B, node #2 receives the switching control instruction from node #1, and updates data written into the network address field and the switching control instruction field. More specifically, node address #3 to which the switching control instruction should be transferred is written into the network address field, and data "+#2" showing that the switching control instruction has been transferred via node #2 is written into the switching control instruction field. Node #2 sends the switching control instruction shown in the right side of FIG. 7B to node #3, which performs the requested switching control process.

In case (3) shown in FIG. 7A, node #1 transfers the switching control instruction to nodes #2 and #3. In this case, data #2 is written into the network address field, and data concerning a command and switching information for the requested switching control is written into the switching control instruction field. It will be noted that symbol "&" denotes the execution of the switching control process. Node #2 receives the switching control instruction from node #1, and executes the requested switching control instruction. Further, node #2 sends the switching control instruction to node #3. The switching control instruction sent by node #2 has the network address field into which the node address #3 is written, and the switching control instruction field in which data  showing that the switching control process has been executed in node #2 is written in addition to data concerning the switching control information addressed to node #3.

In case (4) shown in FIG. 7A, node #2 has branch routes respectively directed to node #3 and another node (not shown). Data #1001 indicating a route passing through nodes #1, #2 and #3 is defined. Node #2 does not perform the switching control process, while node #3 performs the switching control process. It is possible to define the network addresses of the nodes by using a short piece of data, as compared with data using the symbols "+" or "&". By using the data indicating the route via which the switching control instruction should be transferred, it becomes easy to define a complex route having branches.

In case (5) shown in FIG. 7A, data #1002 is defined which indicates a route passing through nodes #1, #2 and #3 and which shows that the switching control instruction should be executed at each of the nodes #2 and #3.

Figure 8:
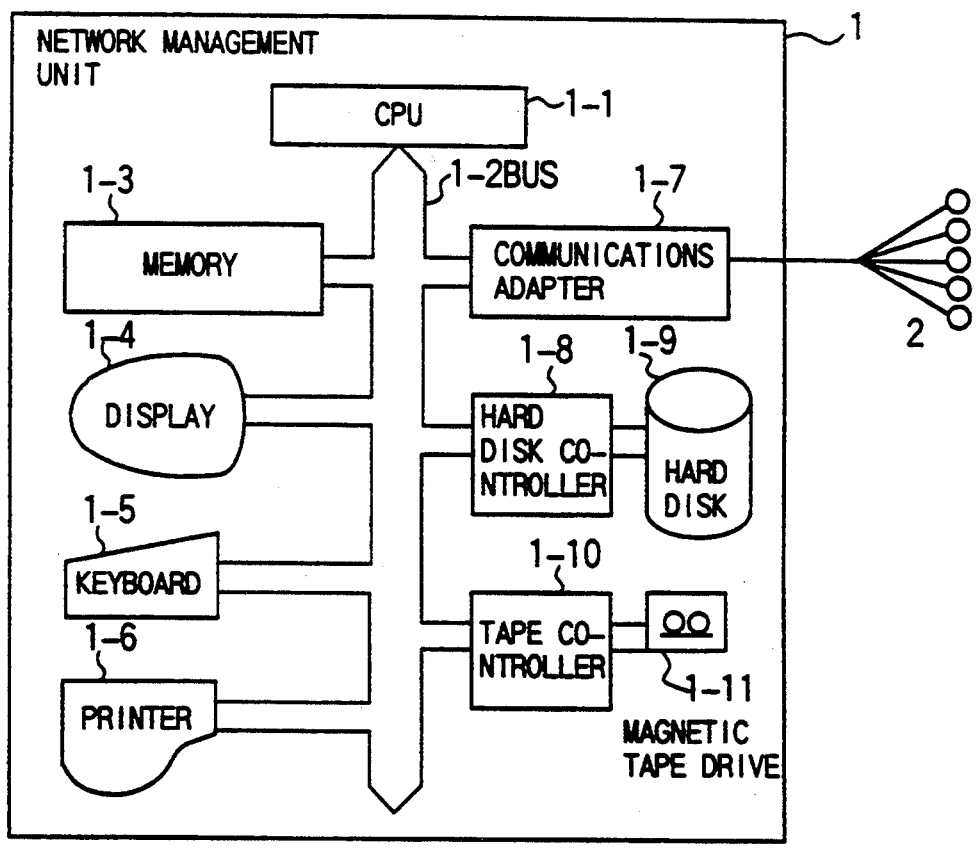
FIG. 8 is a block diagram of a network management device of an embodiment of the present invention.

FIG. 8 shows the structure of the network management device 1 shown in FIG. 4A. The network management device 1 shown in FIG. 8 comprises a CPU 1-1, a bus 1-2, a memory 1-3, a display 1-4, a keyboard 1-5, a printer 1-6, a communications adapter 1-7, a hard disk controller 1-8, a hard disk 1-9, a tape controller 1-10, and a magnetic tape drive 1-11.

The network management device 1 specifies a protection line when a failure has occurred in the network. Instead of the above function or in addition thereto, the network management device 1 determines protection lines beforehand, and informs each node of the predetermined protection lines. For example, as shown in FIG. 2A, the network management device determines that a protection line for the communications channel 4c is the communications channel 5c and that a protection line for the communications channel 5a is the communications channel 4a. Data about these protection lines are stored in the hard disk 1-9. When the CPU 1-1 is informed, via the communications adapter 1-7, that a failure has occurred in the network, the CPU 1-1 reads the communications channel of the related protection line from the hard disk 1-9 via the hard disk controller 1-8, and informs the node to which the switching control instruction should be first sent of the switching control instruction. For example, the CPU 1-1 is informed that a failure has occurred in the active communications channel 4c shown in FIG. 2A, the network management device 1 informs the node 2A that the communications channel 5c is the protection communications channel of the communications channel 4c. The process for determining the protection line for each active line will be described in detail later.

The memory 1-3 is a main memory of the CPU 1-1. The memory 1-3 stores programs for controlling the CPU 1-1, and temporarily stores data to be transferred to another node and data transferred from another node. The display 1-4 displays a variety of information. For example, the display 1-4 displays requests which guide the operator to input necessary information, and the status of the communication channels. The keyboard 1-5 is used for inputting necessary information by the operator. The printer 1-6 prints out necessary information. The magnetic tape controller 1-10 controls the read and write operation of the magnetic tape drive 1-11.

In the description given above, the data about the communications channels of the protection lines is stored on the hard disk 1-9. Alternatively, it is possible to store the above data in the magnetic tape drive 1-11 or store the programs in the hard disk 1-9.

Figure 9:
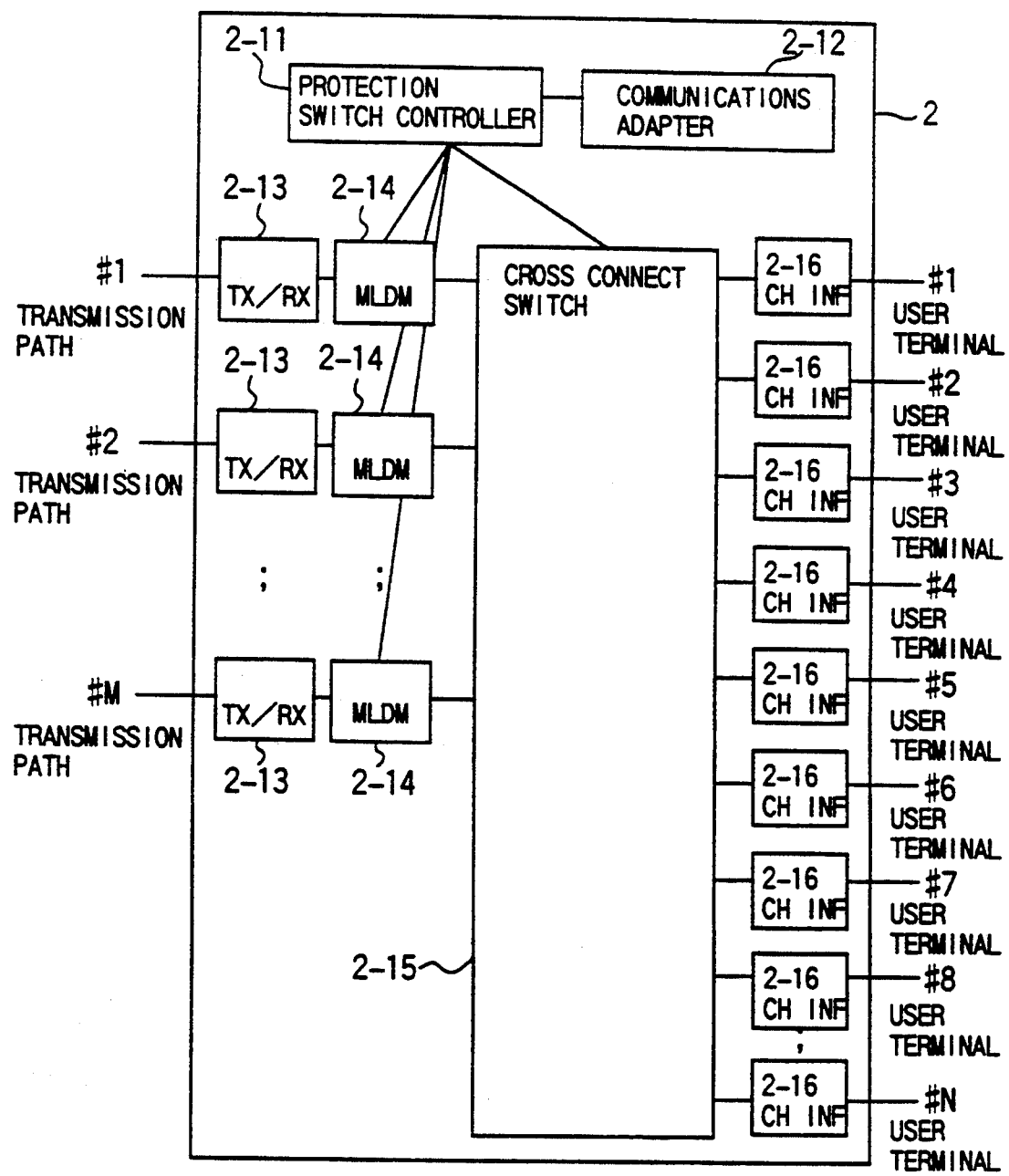
FIG. 9 is a block diagram of each node in the embodiment of the present invention.
Figure 10:
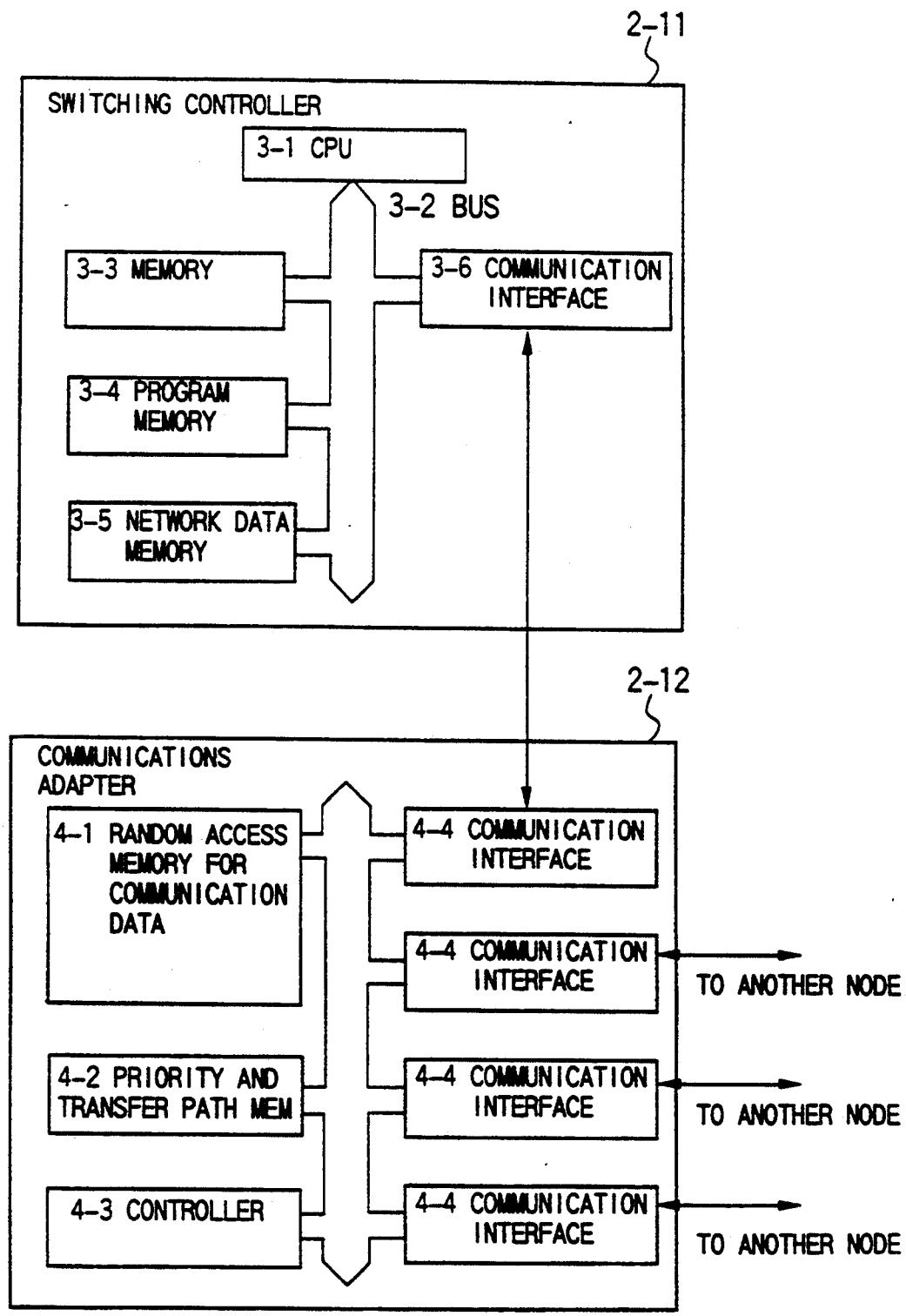
FIG. 10 is a block diagram of a switching controller and a communications adapter in the embodiment of the present invention.

A description will now be given of the structure of each node with reference to FIGS. 9 and 10. FIG. 9 shows the structure of each node, and FIG. 10 shows a switching controller and a communications adapter provided in each node.

Referring to FIG. 9, each node 2 comprises a switching controller 2-11, a communications adapter 2-12, a sender/receiver unit 2-13, a multiplexer/demultiplexer 2-14, a cross-connect switch 2-15, and a channel interface unit 2-16 establishing the node and user terminals. The switching controller 2-11 controls, on the basis of the switching control instruction transferred via the communications adapter 2-12, the switching of the cross-connect switch 2-15 in order to establish the communications channels which couples the nodes to each other. As shown in FIG. 10, the switching controller 2-11 comprises a CPU 3-1, a bus 3-2, a main memory 3-3, a program memory 3-4, a network data memory 3-5, and communications interface unit 3-6. Data for the switching control transferred from the communications adapter 2-12 via the communications interface unit 3-6 is written into the network data memory 3-5. The CPU 3-1 controls the cross-connect switch 2-15 by using the data stored on the network data memory in accordance with a program for use in the switching control.

Returning now to FIG. 9, the communications adapter 2-12 performs a communications control process for controlling communications between the node 2 and the network management device 1 and for controlling communications with another node. As shown in FIG. 10 the communications adapter 2-12 comprises a RAM 4-1, a priority decision/route memory 4-2, a controller 4,3, and a communications interface unit 4-4. The RAM 4-1 temporarily stores data about communications between the nodes, and data about communications between the node 2 and the network management device 1. The priority decision/route memory 4-2 stores the priority order regarding the switching control instruction information, the alarm information, the line setting information, the test control information and so on, and transfer route setting data necessary for generating the switching control instruction. The controller 4-3 integrally controls the communications adapter 2-12, and is formed with a processor. The communications interface unit 4-4 establishes a communications interface with the network management device 1, a communications interface with an adjacent node, and a communications interface with the switching controller 2-11.

When a failure has occurred in a communications channel, the switching controller 2-11 is notified of the occurrence of the failure. Then the CPU 3-1 of the switching controller 2-11 receives the above notification, and reports to the communications adapter 2-12. The communications adapter 2-12 sends an acknowledgement signal to the network management device in response to receipt of the report from the CPU 3-1. The network management device 1 informs the communications adapter 2-12 of the protection line for the communications channel in which the failure has occurred. Data concerning the protection line is temporarily stored in the RAM 4-1. The controller 4-3 generates the switching control instruction having the format shown in FIG. 4B by using the data concerning the protection line, and sends the switching control instruction to the adjacent node. Further, the controller 4-3 sends switching control data about the beginning node from which the switching control instruction is sent first, and then the switching control is performed in the beginning node.

The adjacent node receives the switching control instruction from the beginning node, and operates as follows. When the adjacent node receives the network address of the switching control instruction A shown in FIG. 4B, the controller 4-3 of the adjacent node starts to generate the switching control instruction. By using the switching control instruction received, the switching control is performed in the above adjacent node.

In the above-mentioned manner, the switching control instruction is generated only once by the node which receives the data concerning the protection line from the network management device 1. The adjacent node which receives the switching control instruction starts to generate the switching control instruction when the network address contained in the received switching control instruction is received. Hence, it is possible to rapidly switch to the protection line.

If the route connecting the adjacent nodes to each other is totally cut, it is necessary to immediately establish the protection line. With the above in mind, it is required that the protection lines for the active lines be defined beforehand and that a plurality of protection lines be provided for each active line. Further, it is required that the switching from the active lines to the protection lines be carried out rapidly.

Figure 11:
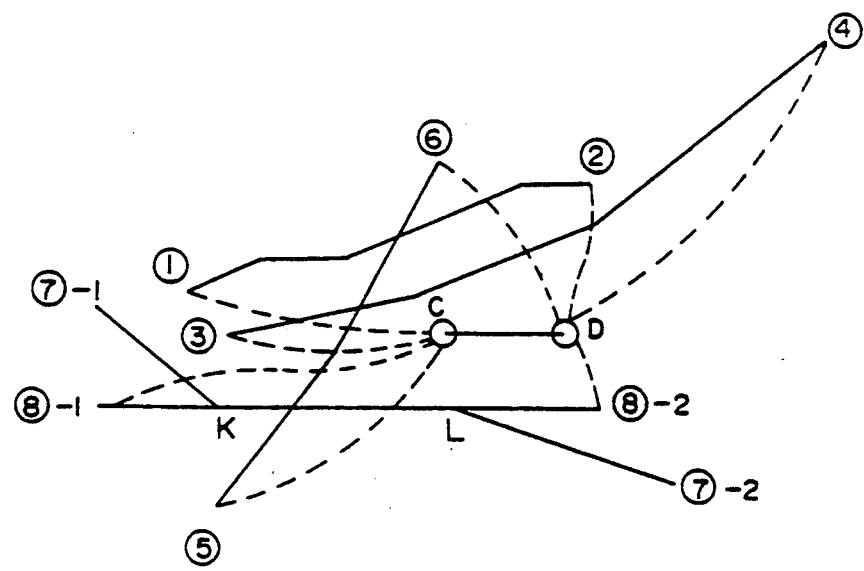
FIG. 11 is a diagram showing a network structure for explaining how a protection line is determined.

In actuality, as shown in FIG. 11, an active line C-D is defined as a protection line for a plurality of active lines, such as active lines 1-2, 3-4, 5-6, 7-1–7-2 and 8-1–8-2. The lines 7-1–7-2 and 8-1–8-2 share a section KL. Protection lines are depicted by broken lines in FIG. 11. If a failure has occurred in the active line C-D, not only the active lines but also the protection lines are greatly affected. With the above in mind, it is necessary to cope with a failure for the active line C-D.

The present invention provides a process for efficiently determining an active line between the adjacent nodes via a shortest route and efficiently determining a protection line for each active line. The term "shortest route" does not means the physically shortest route, but a route including a smallest number of nodes via which the route is established. It will be noted that if the route has an increased number of nodes, it takes a longer time to complete the network switching control.

Figure 12:
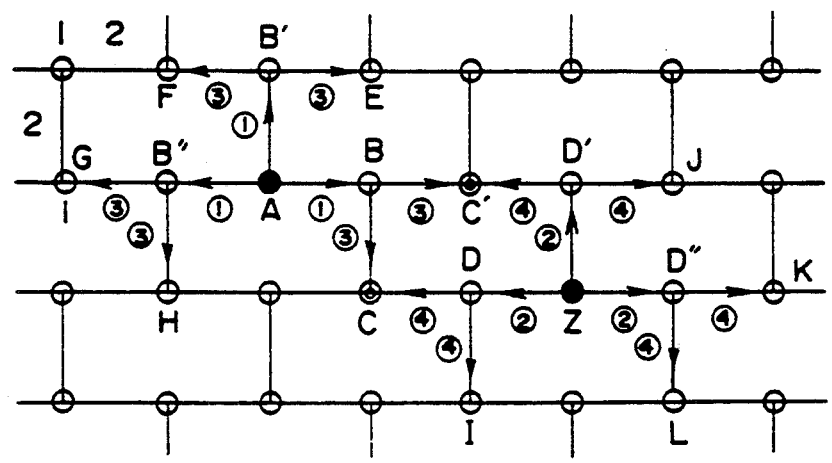
FIG. 12 is a diagram of a network structure for showing a sequence for determining active and protection lines.

A description will now be given, with reference to FIGS. 12 through 14, of a process for determining a communications channel between nodes A and Z in a network shown in FIG. 12. FIG. 12 is a diagram of a network structure showing a sequence for determining active and protection routes. FIGS. 13A through 13C are flow charts of the sequence for determining active and protection routes. FIGS. 14A, 14B and 14C are diagrams showing tables, registers and counters used in the sequence shown in FIGS. 13A through 13C.

A description will now be given of the sequence for determining communications channels established between the nodes A and Z. In FIG. 14A, a table AN shows the names of nodes to be analyzed with respect to the distance between the node A and each node and the direction from the node A to each node. A table ZN shows the names of nodes to be analyzed with respect to the distance between the node z and each node and the direction from the node z to each node. A table AP shows a connection sequence of nodes from the node A with respect to the direction and distance based on the node A. A table AP shows a connection sequence of nodes from the node Z with respect to the direction and distance based on the node A. The distance is represented by numerals, 1, 2, 3, . . . . Distance "0" shows the node A itself. Each node adjacent to the node A has distance "1" from the node A. Distance "2" shows each node which is spaced apart from the node A via one node. In other words, each node having distance "2" is located at the second position from the node A.

Figure 13A:
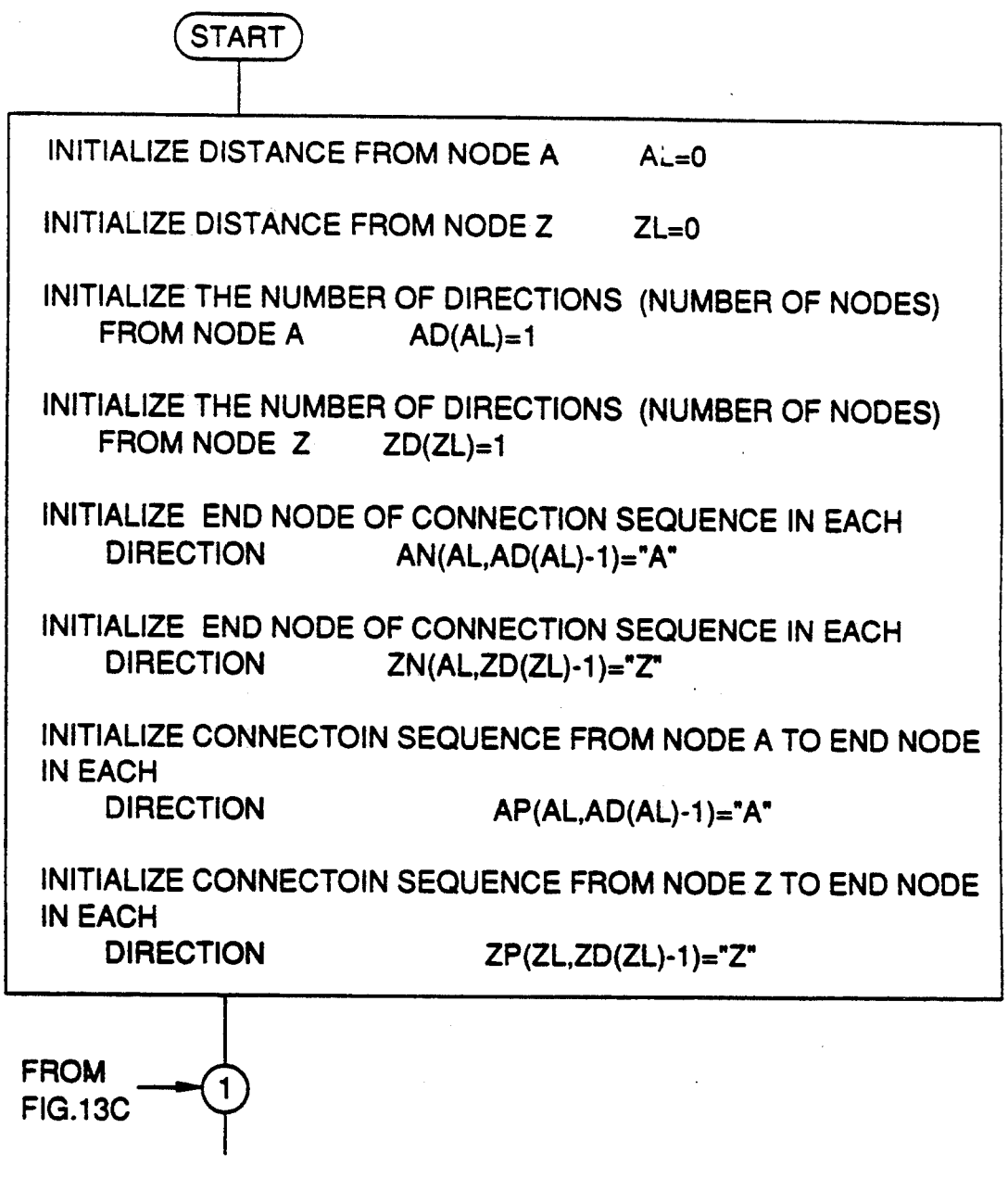
Figure 14A:
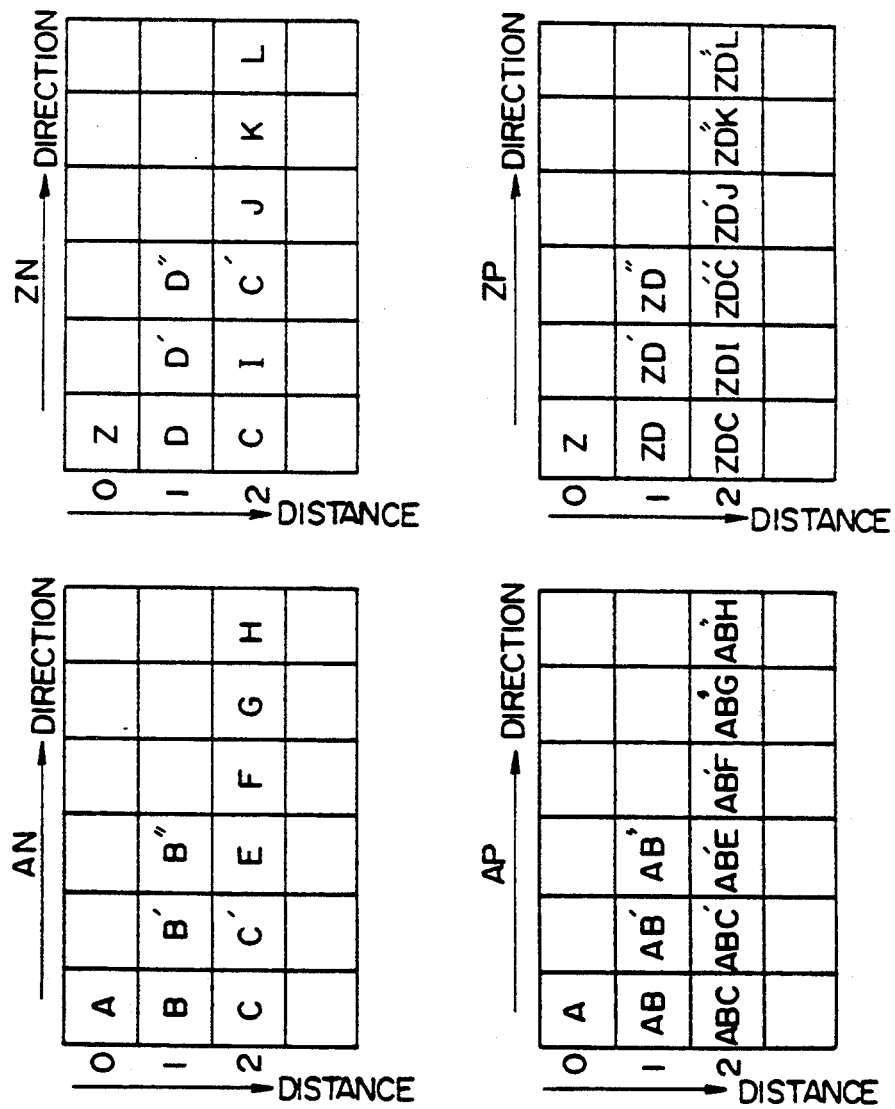
FIGS. 14A, 14B and 14C are diagrams showing tables and memories used in the embodiment of the present invention.
Figure 14B:
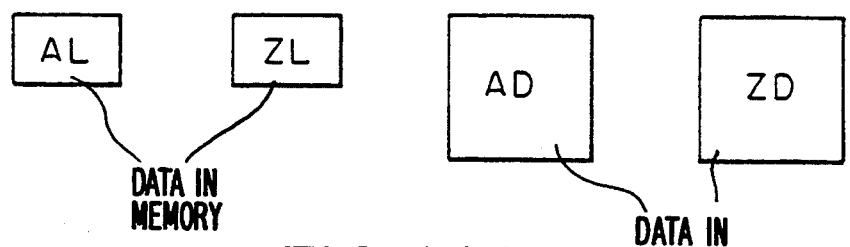
Figure 14C:

Referring to FIG. 13A, each of the tables AN, AP, ZN and ZP are initialized so that A is written, as an initial value, into each of the tables AN and AP and Z is written, as an initial value, into each of the tables ZN and ZP. The names of nodes B, B' and B" each having distance "1" from the node A are written into the table AN, and connection sequences from the node A up to the nodes B, B' and B", that is, AB, AB' and AB" are written into the table AP. The names of nodes D, D' and D" each having distance "1" from the node Z are written into the table ZN, and connection sequences from the node Z to the nodes D, D' and D", that is, ZD, ZD' and ZD" are written into the table ZP. Then, it is checked whether any of the connection sequences written into the table ZP can be joined to any of the connection sequences written into the table AP.

Then, the names of nodes C, C', E, F, G and H, each having distance "1" from any of the nodes B, B' and B", are written into the table AN. Connection sequences from the node A to the nodes C, C', E, F, G and H, that is, ABC, ABC', AB'E, AB'F, AB"G, and AB"H are written into the table AP. Then, it is checked whether any of the connection sequences written into the table ZP can be joined to any of the connection sequences written into the table AP.

Thereafter, the names of nodes C, I, C', J, K and L, each having distance "1" from any of the nodes D, D' and D", are written into the table ZN. Connection sequences from the node Z to the nodes C, I, C', J, K and L, that is, ZDC, ZDI, ZD'C', ZD'J, ZD"K and ZD"L are written into the table ZP. Then it is checked whether any of the connection sequences written into the table ZP can be joined to any of the connection sequences written into the table AP. In the above-mentioned manner, one of the connection sequences from the node A is joined, at the node C, to one of the connection sequences from the node Z, and hence an active communications channel passing through the nodes ABCDZ can be obtained.

After the active communications channel between the nodes A and Z is obtained, a protection channel between the nodes A and Z is obtained in the same manner as mentioned above, assuming that the above active communications channel is "dead". If another protection line is needed, another (second) protection channel is obtained in the same manner as mentioned above, assuming that not only the active communications channel but also the first protection channel are dead.

The above-mentioned procedure (operation) for obtaining the active and protection channels is carried out by the network management device 1 shown in FIG. 8.

Data about the network shown in FIG. 12 is stored in, for example, the hard disk 1-9, and the results of the operation are stored in, for example, the memory 1-3. The program for executing the operation is stored in the hard disk 1-9, and transferred and stored in the memory 1-3 when the operation is executed.

The program for obtaining the active and protection channels is shown in FIGS. 13A through 13C. First, as shown in FIG. 14B, areas for AL, ZL, AD and ZD are formed in the memory 1-3. AL denotes the distance from the node A. That is, AL is data showing by how many nodes the node being now analyzed is spaced apart from the node A. ZL denotes the distance from the node Z. That is, ZL is data showing by how many nodes the node being now analyzed is spaced apart from the node Z. AD denotes how many nodes to be analyzed exist at each distance from the node A exist. ZD denotes how many nodes to be analyzed exist at each distance from the node Z exist. Further, the tables AN, ZN, AP and ZP shown in FIG. 14A are formed in the memory 1-3. Furthermore, areas are respectively provided for repeat variables i, j, m and n. The repeat variable i is used for identifying each node to be analyzed at the distance from the node A or Z being considered. The repeat variable j is used for identifying each node adjacent, via a transmission path, to each node at the distance from the node A or Z being considered. The repeat variable m is used for identifying a distance less than the distance from the node A or Z being considered. The repeat variable n is used for identifying each node located at a distance less than the distance from the node A or Z being considered.

As shown in FIG. 13A, the distance from the node A (the number of transmission paths) is initialized so that AL=0, and the distance from the node Z (the number of transmission paths) is initialized so that ZL=0. Further, the number of directions (the number of nodes) from the node A is initialized so that AD(AL)=1, and the number of directions (the number of nodes) from the node Z is initialized so that ZD(ZL)=1.

The end (node) of a connection sequence (route) in each direction from the node A is initialized so that AN(ZL,AD(AL)−1)="A", and the end (node) of a connection sequence (route) in each direction from the node D is initialized so that ZN(ZL,ZD(ZL)−1)="Z". Then, the connection sequence (a sequence of the names of nodes) from the node A to the end node in each direction is initialized so that AP(AL,AD(AL)−1)="A", and the connection sequence (a sequence of the names of nodes) from the node Z to the end node in each direction is initialized so that ZP(ZL,ZD(ZL)−1)="Z". By performing the above-mentioned initialization process, the distance in each of the tables AN, ZN, AP and ZP is "0".

Next, as shown in FIG. 13B, nodes respectively spaced apart from the node A by distance "1" in a state where transmission paths are connected to end nodes in directions from the node A are identified, and the number of the nodes is calculated. There are nodes B, B' and B" which are spaced apart from the node A by distance "1", and the connection sequences thereof are AB, AB' and AB". It is checked whether or not the nodes B, B' and B" have been passed (accessed). The names of nodes which have not yet been passed and their connection sequences are registered at positions of the tables AN and AP relating to distance "1". Thereafter, it is determined whether or not any of the nodes registered in the table AN is identical to any of the nodes registered in the table ZN. In other words, it is determined whether or not any of the connection sequences registered in the table AP can be joined to any of the connection sequences registered in the table ZP. When the result of the above determination is affirmative, the process shown in FIGS. 13A through 13C ends.

Then, nodes respectively spaced apart from the node Z by distance "1" in a state where transmission paths are connected to end nodes in directions from the node Z are identified, and the number of the nodes is calculated. There are nodes D, D' and D" which are spaced apart from the node Z by distance "1", and the connection sequences thereof are ZD, ZD' and ZD". It is checked whether or not the nodes D, D' and D" have been passed (accessed). The names of nodes which have not yet been passed and their connection sequences are registered at positions of the tables ZN and ZP relating to distance "1". Thereafters, it is determined whether or not any of the nodes registered in the table ZN is identical to any of the nodes registered in the table AN. In other words, it is determined whether or not any of the connection sequences registered in the table ZP can be joined to any of the connection sequences registered in the table AP. When the result of the above determination is affirmative, the process shown in FIGS.13A through 13C ends.

When the result of the determination in the process shown in FIG. 13B or FIG. 13C is negative, the processes shown in FIGS. 13B and 13C are repeatedly carried out until the affirmative result is obtained. In the example shown in FIG. 14A, node C at distance "2" from the node A registered in the table AN is also obtained at distance "2" from the node Z registered in the table ZN. Further, node C' is registered in distance "2" in each of the tables AN and ZN. In this case, either node C or node C' can be selected in order to define the active route (transmission path) between the nodes A and Z. For example, the above selecting process is performed based on which one of the nodes C and C' is obtained first during the execution of the process shown in FIGS. 13A through 13C. Alternatively, it is possible to select the node capable of providing a route in which idle communications channels are available.

Figure 15:
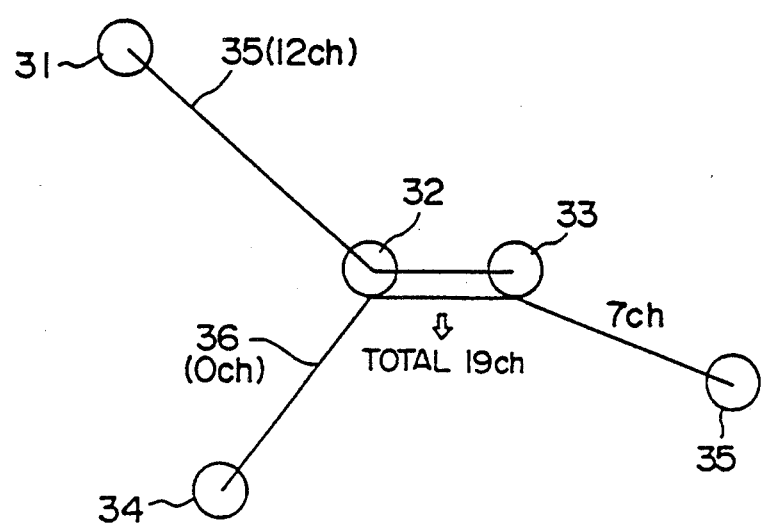
FIG. 15 is a diagram for explaining communications channels.

A description will now be given of a second embodiment of the present invention. Referring to FIG. 15, a communications route connecting the nodes 31, 32 and 33 includes 12 communications channels, and a communications route connecting the nodes 34, 32, 33 and 35 includes 7 communications channels. In this case, 19 communications channels are available between the nodes 32 and 33. If a failure has occurred in the route between the nodes 31 and 32, the switching control instruction is issued in each channel unit. Hence, the switching control instructions is repeatedly sent 12 times, and it takes a long time to complete the network switching.

The second embodiment of the present invention is intended to eliminate the above problem and switch all communications channels in one communications route by one switching control instruction. In order to achieve the above, a group switching control instruction is provided in which a switching command and a group name are included, and communications channels are grouped beforehand. Each node in a communications route belonging to a group stores the channel identification numbers forming the above group. Each node decodes the group switching control instruction received, and accesses the built-in memory 3-3 by referring to the group name. In this manner, each node obtains the channel numbers belonging to the group, and executes the switching to the channels.

Figure 16A:
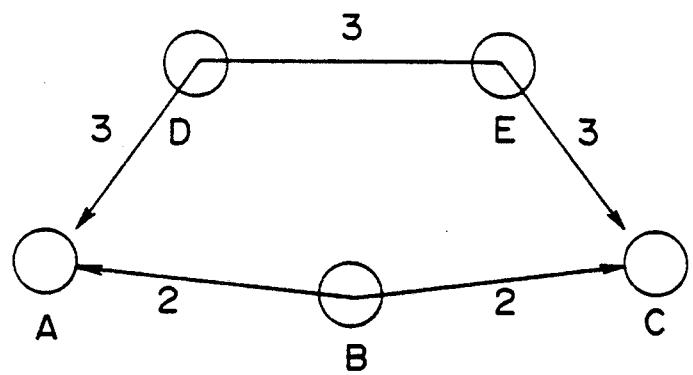

A further description of the second embodiment of the present invention will be described with reference to FIGS. 16A, 16B and 16C. Referring to FIG. 16A, a route that connects nodes A, B and C is used as an active line, and a route that connects nodes A, D, E and C is used as a protection line.

Figure 16B:
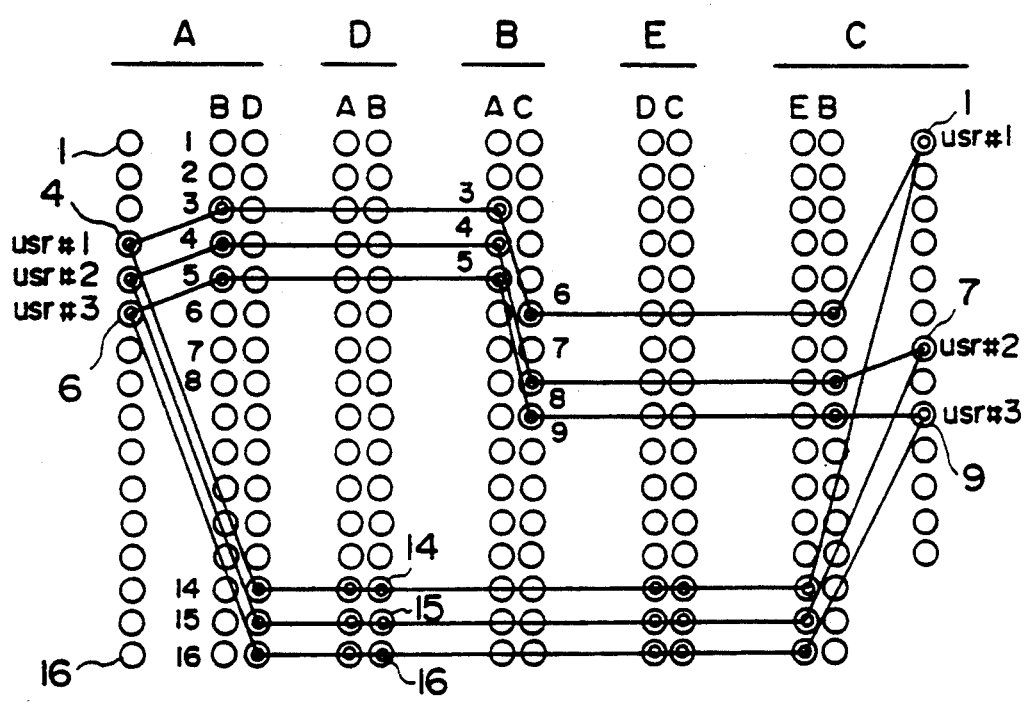

As shown in FIG. 16B, users #1, #2 and #3 are connected to the node A via user terminal communications channels 4, 5 and 6, respectively. The node A is connected to the node B via communications channels 3, 4 and 5 of the active communications line on the node B side. The node B and node C are connected to each other via communications channels 6, 8 and 9 of the active communications line. The node B is connected to users #1, #2 and #3 via user terminal communications channels 1, 7 and 9.

As shown in FIG. 16C, if a failure which has occurred in the active communications line of the node A is detected and it is determined that the switching control should be performed, the node A sends the switching control instruction to the node D in the protection communications route. As shown in FIG. 16B, the user terminal communications channels 4, 5 and 6 to which the users #1, #2 and #3 are respectively connected are switched, at the node A, to communications channels 14, 15 and 16 in the case of the node D. At the node D, the CPU 3-1 thereof understands, from the group name (#3, for example) contained in the group switching control instruction, that the group switching control is requested. Then, the CPU 3-1 of the node D accesses the memory 3-3 by using the group name contained in the group switching control instruction received from the node A. Thereby, the CPU 3-1 understands that the communications channels 14, 15 and 16 are included in the group, and establishes a communications route shown in FIG. 16B.

The group switching control instruction is sequentially transferred to the nodes E and C. At each of the nodes E and C, the same control process as described above is carried out, and hence the communications route including communications channels 14, 15 and 16 is established.

The CPU 3-1 of the node C decodes the group switching control instruction, and accesses the memory 3-1 by using the group name contained therein. The communications channels 14, 15 and 16 on the side of the node E are connected to the communications channels 14, 15 and 16 of the node C. Then, the CPU 3-1 of the node C connects the communications channels 14, 15 and 16 to user terminal communications channels 1, 7 and 9 to which the users #1, #2 and #3 are respectively connected. In this manner, the network switching is carried out at each node.

When the failure has been eliminated, the node A outputs a group switch-back instruction to the node D, This group switch-back instruction is transferred to the node C via the node E. At each of the nodes A, D, E and C, the network switching is carried out so that the original active communications line is activated instead of the protection communications line, which is then released from the in-use state. Thereby, the released protection line becomes available as the idle protection line.

According to the second embodiment of the present invention, a plurality of communications channels are switched at the same time. Thus, it takes a shorter time to complete the network switching at a smaller communications error rate.

What is claimed is:

1. A network switching control method in a communications network having plural nodes and plural transmission paths connecting the plural nodes for controlling switching from an active route, formed by one of the plural transmission paths, to a protection route, formed by another of the plural transmission paths and comprising n nodes of the plural nodes where n is an integer larger than or equal to 2, when a failure has occurred in any of the plural nodes or any of the plural transmission paths connecting the respectively corresponding nodes, said network switching control method comprises the steps of:
  (a) determining the active route through the plural nodes and the protection route through the plural nodes;
  (b) generating, at a first node which is one of the n nodes, a switching control instruction which includes information for requesting each of $n-1$ nodes, other than the first node, to form the protection route, said switching control instruction including address information concerning the nodes forming the protection route;
  (c) sending the switching control instruction from the first node to a second node, which is one of the $n-1$ nodes other than, and adjacent to, the first node;
  (d) generating, at each ith node of the plural nodes where $i=2, 3, \ldots, n-1$ and n is greater than or equal to 4, a switching control instruction to be transferred to a respective, first adjacent node in the protection route in response to receipt of information indicating an address of the ith node included in a switching control instruction transferred from a respective, second adjacent node in the protection route; and
  (e) transferring the switching control instruction generated in the step (d) by the ith node to the respective, first adjacent node.

2. A network switching control method as claimed in claim 1, wherein the step (d) comprises the step of generating, at each said ith node, the switching control instruction to be transferred to the respective, first adjacent node when the information indicating the address of the ith node included in the switching control instruction transferred from the respective, second adjacent node is received.

3. A network switching control method as claimed in claim 1, wherein the step (d) comprises the step of generating, at each said ith node, the switching control instruction to be transferred to the respective, first adjacent node on the basis of the switching control instruction transferred from the respective, second adjacent node.

4. A network switching control method as claimed in claim 1, wherein the step (b) comprises the steps of:
  receiving data concerning the protection route from a network management device provided in the communications network; and
  generating, at the first node, the switching control instruction on the basis of the data received from the network management device.

5. A network switching control method as claimed in claim 1, wherein:
  said protection route comprises communication channels;
  the step (b) comprises the step of generating the switching control instruction for each of the communications channels included in the protection route; and
  the step (d) comprises the step of generating the switching control instruction for each of the communications channels included in the protection route.

6. A network switching control method as claimed in claim 1, wherein:
  said protection route comprises groups of communications channels;
  the step (b) comprises the step of generating the switching control information which indicates one group of communications channels included in the protection route; and
  the network switching control method comprises the step of executing, at each of the n nodes, switching from the active route to the one group of communications channels included in the protection route in response to receipt of the switching control instruction received from the respective, first adjacent node so that the communications channels are switched to the protection route at one time.

7. A network switching control method as claimed in claim 6, wherein said network switching control method further comprises the steps of referring to, at each of the second to nth nodes, information which is stored in a memory of each of the second to nth nodes and which indicates the communications channels belonging to the one group, in response to receipt of the switching control instruction transferred from the respective, first adjacent node.

8. A network switching control method as claimed in claim 1, wherein:
  the step (b) comprises the step of generating, at the first node, the switching control instruction which includes first address information indicating the second node in the protection route and the second address information indicating the third to nth nodes in the protection route; and
  the step (d) comprises the step of starting to generate, at the second node, the switching control information when the first address information generated by the step (b) is received.

9. A network switching control method as claimed in claim 1, wherein:
  the step (b) comprises the step of generating, at the first node, the switching control instruction which first includes first address information indicating the second node and second address information indicating the second to nth nodes; and
  the step (d) comprises the step of generating, at each said ith node, the switching control information which includes third address information indicating the (i+1)th node and fourth address information indicating the (i+1)th to nth nodes.

10. A network switching control method as claimed in claim 1, wherein step (a) comprises the steps of:
  alternately extending paths from the first node and the nth node by a unit distance connecting two adjacent nodes to each other; and
  detecting an intermediate node where the paths extending from the first node and the nth node are joined together,
  a route including the paths joined together at said intermediate node being determined as being the active route or the protection route.

11. A network switching control method as claimed in claim 1, wherein said network switching control method comprises the step of sending, separately from the switching control instruction, management information which is used for managing the network from one of the nodes to another one of the nodes.

12. A network switching control method as claimed in claim 1, wherein said network switching control method comprises the step, at each of the n nodes, of switching from the active route to the protection route in response to the switching control instruction generated by either the step (b) or the step (d) and sent by the step (c) or the step (e).

13. A network switching control method as claimed in claim 1, wherein said network switching control method comprises the steps of:
generating a switch-back instruction which requests the switching from the protection route to the active route; and
sequentially transferring the switch-back instruction via the nodes.

14. A network switching control system comprising:
a plurality of nodes forming a network, each node having a respective, first adjacent node and a respective, second adjacent node;
a plurality of transmission routes, formed by the nodes and comprising communications channels between each of the plurality of nodes, including an active route and a protection route, said active route formed by a first subset of the plurality of nodes, and said protection route formed by a second subset of the plurality of nodes; and
network management means, operatively coupled to the nodes, for managing the network formed by the nodes connected to the transmission routes by determining the active route and the protection route,
wherein each one of the plurality of nodes comprises:
switch means for selectively coupling incoming communications channels and outgoing communications channels with one another to selectively form one of the plurality of transmission routes;
first means for generating a switching control instruction which requests the second subset of nodes instead of the first subset of nodes in response to the switching control instruction transferred from the respective, first adjacent node in the protection route; and
second means, operatively coupled to said switch means and said first means, for transferring the switching control instruction generated by said first means to the respective, second adjacent node in the protection route via said switch means.

15. A network switching control system as claimed in claim 14, wherein said first means of each of the nodes comprises means for starting to generate the switching control instruction to be transferred to the second adjacent node when information which is included in the switching control information and which indicates a node in which said first means is provided is received.

16. A network switching control system as claimed in claim 14, wherein said first means of each of the nodes comprises means for generating the switching control instruction to be transferred to the respective, second adjacent node on the basis of the switching control instruction transferred from the first adjacent node.

17. A network switching control system as claimed in claim 14, wherein said first means of each of the nodes comprises means for generating the switching control instruction to be transferred to a respective, adjacent node on the basis of data concerning the protection route supplied from said network management means.

18. A network switching control system as claimed in claim 14, wherein:
said first means of each of the nodes comprises means for generating the switching control instruction to be transferred to the respective, second adjacent node for each of the communications channels included in the protection route; and
the network switching control system comprises control means, operatively coupled to said first means, for controlling said first means so that the switching control instruction is generated for each of the communications channels included in the protection route.

19. A network switching control system as claimed in claim 14, wherein:
said communications channels included in said protection route comprise at least a first group;
said first means of each of the nodes comprises means for generating the switching control information which indicates the first group of communications channels included in the protection route; and
the network switching control system comprises control means, operatively coupled to said first means, for controlling said first means so that the switching control instruction is generated in in such a manner that the communications channels are switched to the protection route at one time.

* * * * *

UNITED STATES PATENT AND TRADEMARK OFFICE
CERTIFICATE OF CORRECTION

PATENT NO. : 5,347,271
DATED : September 13, 1994
INVENTOR(S) : Masaaki Iwasaki

It is certified that error appears in the above-indentified patent and that said Letters Patent is hereby corrected as shown below:

<u>IN THE TITLE PAGE</u>,

In the title, change "CONTOROL" to --CONTROL--.

In the Abstract, change "met:hod" to --method--.

<u>Col. 1</u>, line 1, "CONTOROL" should be --CONTROL--.

<u>Col. 2</u>, line 42, change "," to --.--; and
    line 45, change "," to --.--.

<u>Col. 3</u>, line 35, change ";" to --.--.

<u>Col. 5</u>, line 27, change "abovementioned" to --above-mentioned--.

*<u>Col. 6</u>, line 26, change "he" to --the--.

<u>Col. 8</u>, line 63, "change "communication" to --communications--.

<u>Col. 9</u>, line 60, after "device" insert --1--.

<u>Col. 13</u>, line 14, change "Thereafters" to --Thereafter--.

<u>Col. 14</u>, line 55, change "," to --.--.

*<u>Col. 18</u>, line 47, delete "in".

Signed and Sealed this

Twentieth Day of June, 1995

Attest:

BRUCE LEHMAN

Attesting Officer    Commissioner of Patents and Trademarks